US012625073B2

(12) United States Patent
Jin et al.

(10) Patent No.: US 12,625,073 B2
(45) Date of Patent: May 12, 2026

(54) METHOD FOR CHARACTERIZING MELTING TRANSITION AND CRYSTALLIZATION IN A SEMICRYSTALLINE POLYMER

(71) Applicants: Kailong Jin, Phoenix, AZ (US); Richard Nile, Tempe, AZ (US)

(72) Inventors: Kailong Jin, Phoenix, AZ (US); Richard Nile, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 870 days.

(21) Appl. No.: 17/973,521

(22) Filed: Oct. 25, 2022

(65) Prior Publication Data

US 2023/0152223 A1    May 18, 2023

Related U.S. Application Data

(60) Provisional application No. 63/279,387, filed on Nov. 15, 2021.

(51) Int. Cl.
*G01N 21/64* (2006.01)
*G01N 25/04* (2006.01)

(52) U.S. Cl.
CPC ............. *G01N 21/64* (2013.01); *G01N 25/04* (2013.01)

(58) Field of Classification Search
CPC ...... G01N 21/64; G01N 21/643; G01N 25/04; G01N 25/4866; G01N 25/38; G01N 25/4846; G01N 33/44

USPC ........... 436/147, 164, 172; 422/82.08, 82.12
See application file for complete search history.

(56) References Cited

FOREIGN PATENT DOCUMENTS

WO      2017/080357 A1 *  5/2017

OTHER PUBLICATIONS

Nile et al. Macromolecular Chemistry and Physics, vol. 224, 2300230, pp. 1-12, 2023.*

(Continued)

*Primary Examiner* — Maureen Wallenhorst
(74) *Attorney, Agent, or Firm* — Fuller IP Law LLC; Rodney J. Fuller

(57) ABSTRACT

A method for characterizing a melting transition in a semicrystalline polymer is disclosed. The method includes incorporating a fluorophore into the semicrystalline polymer, changing a temperature of the semicrystalline polymer to vary across a range of temperatures including a plurality of temperatures, and capturing an emission spectrum of the incorporated fluorophore at each temperature of the plurality of temperatures. The method also includes integrating each emission spectrum to determine a temperature-dependent integrated fluorescence intensity for the semicrystalline polymer, numerically differentiating the temperature-dependent integrated fluorescence intensity, and characterizing the melting transition of the semicrystalline polymer by identifying a stepwise change in value of the differentiated intensity. The semicrystalline polymer may be a thermoplastic. Incorporating the fluorophore into the semicrystalline polymer may include physically doping the semicrystalline polymer with the fluorophore or covalently labeling the semicrystalline polymer with the fluorophore.

20 Claims, 19 Drawing Sheets

(56)            References Cited

OTHER PUBLICATIONS

Askar et al., Residual stress relaxation and stiffness in spin-coated polymer films: characterization by ellipsometry and fluorescence, Polymer 76 (2015) 113-122.

Bao et al., B.Z. Tang, Sensitive and reliable detection of glass transition of polymers by fluorescent probes based on AIE luminogens, Polym. Chem. 6 (18) (2015) 3537-3542.

Bunn et al., Identification of the high-melting crystalline phase in high-temperature crystalline by solid-state NMR spectroscopy, Macromolecules 26 (22) (1993) 6138-6140.

Chanda, Introduction to Polymer Science and Chemistry: a Problem-Solving Approach, CRC Press, 2013.

Chen et al., In situ observation of low molecular weight poly(ethylene oxide) crystal melting, recrystallization, Polymer 44 (19) (2003) 6051-6058.

Ellison et al., Sensing the glass transition in thin and ultrathin polymer films via fluorescence probes and labels, J. Polym. Sci., Part B: Polym. Phys. 40 (24) (2002) 2745-2758.

Ellison et al., The distribution of glass-transition temperatures in nanoscopically confined glass formers, Nat. Mater. 2 (10) (2003) 695-700.

Evans et al., Major roles of blend partner fragility and dye placement on component glass transition temperatures: fluorescence study of near-infinitely dilute species in binary blends, Macromolecules 45 (20) (2012) 8319-8327.

Flier et al., Heterogeneous diffusion in thin polymer films as observed by high-temperature single-molecule fluorescence microscopy, J. Am. Chem. Soc. 134 (1) (2012) 480-488.

Frank, Observation of relaxation processes near the glass transition by means of excimer fluorescence, Macromolecules 8 (3) (1975) 305-310.

Goderis et al., Use of SAXS and linear correlation functions for the determination of the crystallinity and morphology of semi-crystalline polymers. Application to linear polyethylene, J. Polym. Sci., Part B: Polym. Phys. 37 (14) (1999) 1715-1738.

Hiemenz et al., Polymer Chemistry, CRC press, 2007.

Hong et al., Aggregation-induced emission, Chem. Soc. Rev. 40 (11) (2011) 5361-5388.

Hong et al., Aggregation-induced emission: phenomenon, mechanism and applications, Chem. Commun. 29 (2009) 4332-4353.

Hsiao et al., Crystallization-enhanced emission through hydrogen-bond interactions in blends containing hydroxyl-functionalized azine and poly (4-vinyl pyridine), J. Mater. Chem. C 2 (24) (2014) 4828-4834.

Hsiao et al., Crystallization-promoted emission enhancement of poly(I-lactide) containing a fluorescent salicylideneazine center with aggregation-enhanced emission properties, Polym. Chem. 6 (12) (2015) 2264-2273.

Hu, The physics of polymer chain-folding, Phys. Rep. 747 (2018) 1-50.

Jerome et al., Recent advances in the synthesis of aliphatic polyesters by ring-opening polymerization, Adv. Drug Deliv. Rev. 60 (9) (2008) 1056-1076.

Jin et al., Enhanced Tg-confinement effect in cross-linked polystyrene compared to its linear precursor: roles of fragility and chain architecture, Macromolecules 49 (14) (2016) 5092-5103.

Jin et al., Tg-confinement effects in strongly miscible blends of poly (2,6-dimethyl-1,4-phenylene oxide) and polystyrene: roles of bulk fragility and chain segregation, Polymer 118 (2017) 85-96.

Kambe, Thermal behaviour of poly(ethylene oxide) as revealed by differential scanning calorimetry, Polymer 21 (3) (1980) 352-355.

Katsumata et al., Glass transition and self-diffusion of unentangled polymer melts nanoconfined by different interfaces, Macromolecules 51 (19) (2018) 7509-7517.

Kawana et al., Character of the glass transition in thin supported polymer films, Phys. Rev. E 63 (2) (2001), 021501.

Kelly et al., Thermal transitions in semi-crystalline polymer thin films studied via spectral reflectance, Polymer 143 (2018) 336-342.

Khorloo et al., Multiscale morphological visualization of a semi-crystalline polymer by a polymorphic AIE marker, ChemRxiv (2019), 8786129.

Kim et al., Thickness dependence of the melting temperature of thin polymer films, Macromol. Rapid Commun. 22 (6) (2001) 386-389.

Leung et al., Restriction of intramolecular motions: the general mechanism behind aggregation-induced emission, Chem. Eur J. 20 (47) (2014) 15349-15353.

Loutfy, Fluorescence probes for polymer free-volume, in: Photophysical and Photochemical Tools in Polymer Science, Springer, 1986, pp. 429-448.

Miyoshi et al., Molecular ordering and molecular dynamics in isotactic-polypropylene characterized by solid state NMR, J. Phys. Chem. B 114 (1) (2010) 92-100.

Murphy et al., A Comparison of the use of FTIR spectroscopy with DSC in the characterisation of melting and crystallisation in polycaprolactone, J. Therm. Anal. Calorim. 107 (2) (2012) 669-674.

Nile et al., Sensing the melting transition of semicrystalline polymers via a novel fluorescence technique, Polymer, vol. 230, 2021, 124070, ISSN 0032-3861, https://doi.org/10.1016/j.polymer.2021. 124070. (https://www.sciencedirect.com/science/article/pii/ S0032386121006935).

Pan et al., Polymorphous crystallization and multiple melting behavior of poly(I-lactide): molecular weight dependence, Macromolecules 40 (19) (2007) 6898-6905.

Pearce et al., Imaging of melting and crystallization of poly(ethylene oxide) in real-time by hot-stage atomic force microscopy, Macromolecules 30 (19) (1997) 5843-5848.

Priestley et al., Structural relaxation of polymer glasses at surfaces, interfaces, and in between, Science 309 (5733) (2005) 456-459.

Qiu et al., A simple and sensitive method for an important physical parameter: reliable measurement of glass transition temperature by AIEgens, Macromolecules 50 (19) (2017) 7620-7627.

Qiu et al., The marriage of aggregation-induced emission with polymer science, Macromol. Rapid Commun. 40 (1) (2019) 1800568.

Ramesh et al., High-temperature X-ray diffraction studies on the crystalline transitions in the α- and γ-forms of nylon-6, Macromolecules 34 (10) (2001) 3308-3313.

Righetti, Crystallization of polymers investigated by temperature-modulated DSC, Materials 10 (4) (2017) 442.

Royal et al., Molecular-scale asymmetry and memory behavior in poly (vinyl acetate) monitored with mobility-sensitive fluorescent molecules, Macromolecules 25 (6) (1992) 1705-1710.

Samuel et al., Estimating percent crystallinity of polyethylene as a function of temperature by Raman spectroscopy multivariate curve resolution by alternating least squares, Anal. Chem. 89 (5) (2017) 3043-3050.

Schick, Differential scanning calorimetry (DSC) of semicrystalline polymers, Anal. Bioanal. Chem. 395 (6) (2009) 1589.

Tanaka et al., Study of crystallization process of polymer from melt by a real-time pulsed NMR measurement, J. Chem. Phys. 85 (10) (1986) 6197-6209.

Tian et al., Crystallization of polycaprolactone with reduced entanglement, Eur. Polym. J. 102 (2018) 38-44.

Wang et al., Confined crystallization of PEO in nanolayered films impacting structure and oxygen permeability, Macromolecules 42 (18) (2009) 7055-7066.

Wang et al., Confined crystallization of polyethylene oxide in nanolayer assemblies, Science 323 (5915) (2009) 757-760.

Wang et al., Polymer melting: heating rate effects on DSC melting peaks, Thermochim. Acta 231 (1994) 203-213.

Wang et al., Role of thermal history on the thermal behavior of poly(L-lactic acid) studied by DSC and optical microscopy, J. Therm. Anal. Calorim. 80 (1) (2005) 171-175.

Wang et al., Substrate effect on the melting temperature of thin polyethylene films, Phys. Rev. Lett. 96 (2) (2006), 028303.

Yu et al., Isothermal crystallization kinetics and time-temperature-transformation of the conjugated polymer: poly(3-(2'-ethyl)hexylthiophene), Chem. Mater. 29 (13) (2017) 5654-5662.

Zhang et al., Restriction of Intramolecular Motion (RIM): investigating AIE mechanism from experimental and theoretical studies, Chem. Res. Chin. Univ. 37 (1) (2021) 1-15.

* cited by examiner

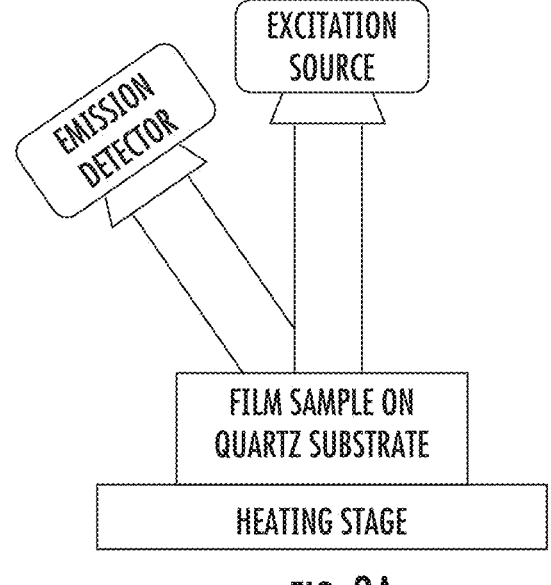
FIG. 3A
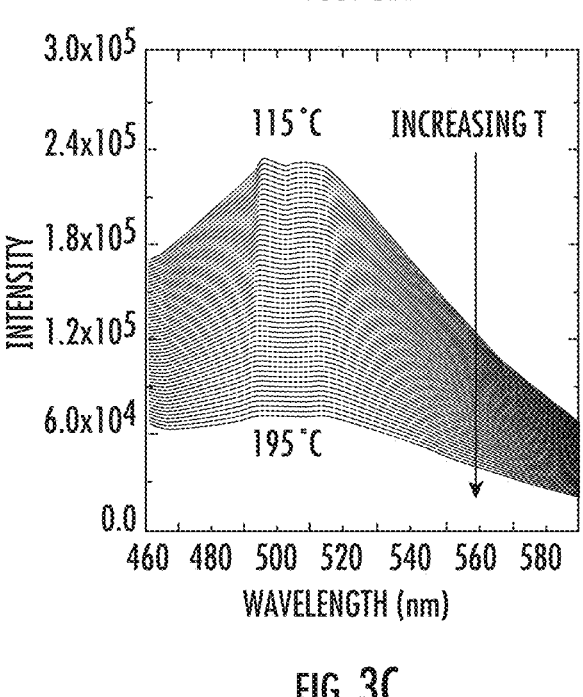
FIG. 3C
FIG. 3B
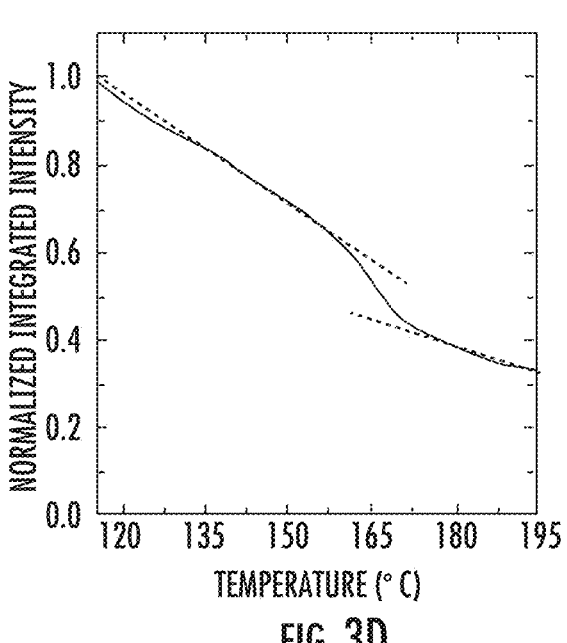
FIG. 3D

METHOD FOR CHARACTERIZING MELTING TRANSITION AND CRYSTALLIZATION IN A SEMICRYSTALLINE POLYMER

CROSS-REFERENCE TO RELATED APPLICATIONS

This application claims the benefit of U.S. Provisional Application No. 63/279,387, entitled "Method for Characterizing a Melting Transition in a Semicrystalline Polymer" which was filed Nov. 15, 2021, the entire disclosure of which is hereby incorporated herein by this reference.

TECHNICAL FIELD

Embodiments of the present disclosure relate to the field of characterizing melting transitions and crystallization in semicrystalline polymers.

BACKGROUND

The melting point ($T_m$) is an important physical parameter that dictates the thermal, mechanical, and transport properties of a given semicrystalline polymer, such as a semicrystalline thermoplastic. Below $T_m$ the material is a solid with robust mechanical performance, while above $T_m$ the material is a liquid that is easier to process. Thus, the melting point $T_m$ sets the upper service temperature for semicrystalline thermoplastics, which plays a similar role as the glass transition temperature, $T_g$, in setting the boundary between solid state application and liquid state processing for amorphous thermoplastics (e.g., polystyrene, poly(methyl methacrylate), etc.). Because perfectly crystalline polymers are rare in real world applications and semicrystalline polymers usually contain crystallites of different sizes, $T_m$ more often represents a melting transition range where large segments of the polymer chain start to move after melting. The ability to precisely determine and thereby engineer $T_m$ is key to the design and application of semicrystalline thermoplastics.

Various characterization methods have been employed for probing melting transitions of semicrystalline thermoplastics. These conventional methods can be categorized into three major groups: First, techniques that can observe a thermal and/or mechanical property change around $T_m$, e.g., differential scanning calorimetry, ellipsometry/spectral reflectance, and shear modulus force microscopy. These techniques can measure $T_m$ by monitoring temperature-dependent heat capacity, thermal expansivity, and modulus, respectively. Second, techniques that can probe morphological or structural change near $T_m$, e.g., optical microscopy/atomic force microscopy, and X-ray based methods (e.g., X-ray diffraction, grazing-incidence wide-angle X-ray scattering, small angle X-ray scattering, etc.) can measure $T_m$ by monitoring temperature-dependent morphology and microstructure, respectively. Third, techniques that can observe a change in a molecular property (e.g., chain conformation) near $T_m$, e.g., Raman spectroscopy, Fourier-transform infrared spectroscopy (FTIR), solid-state NMR, etc.). These techniques can measure $T_m$ by monitoring temperature-dependent absorption bands that are indicative of molecular motions and thus chain conformations.

Although these conventional methods for characterization have been well developed, they each suffer from various limitations. For example, X-ray based techniques require exposure to X-ray beams which might be detrimental to some soft polymeric materials. Additionally, most of these methods are only able to measure spatially averaged properties throughout a bulk sample or a film cross section. They are not well adapted for characterizing melting transitions in more complicated polymer systems, such as multilayer films, blends, and composites.

SUMMARY

In some aspects, the disclosure concerns methods for characterizing a melting transition in a semicrystalline polymer, comprising: incorporating a fluorophore into the semicrystalline polymer; changing a temperature of the semicrystalline polymer to vary across a range of temperatures comprising a plurality of temperatures; capturing an emission spectrum of the incorporated fluorophore at each temperature of the plurality of temperatures; integrating each emission spectrum to determine a temperature-dependent integrated fluorescence intensity for the semicrystalline polymer; numerically differentiating the temperature-dependent integrated fluorescence intensity; and characterizing the melting transition of the semicrystalline polymer by identifying a stepwise change in value of the differentiated intensity.

In some embodiments, the melting transition is melt crystallization. In certain embodiments, the semicrystalline polymer is a thermoplastic.

Some semicrystalline polymer comprise at least one of polyethylene, polypropylene, poly(L-lactic acid) (PLLA), poly(caprolactone) (PCL), and poly(ethylene oxide) (PEO).

In certain embodiments, incorporating the fluorophore into the semicrystalline polymer comprises physically doping the semicrystalline polymer with the fluorophore. In some embodiments, incorporating the fluorophore into the semicrystalline polymer comprises covalently labeling the semicrystalline polymer with the fluorophore. Some fluorophores comprise 1,2-bis(2,4-dihydrobenzylidene) hydrazine.

In some embodiments, capturing an emission spectrum of the incorporated fluorophore comprises placing the semicrystalline polymer with incorporated fluorophore on a quartz slide.

In certain embodiments, the melt crystallization is observed in a temperature range of 195° C. to 60° C. or any subset range within the 195° C. and 60° C. range.

In another aspect, the disclosure concerns methods of characterizing the melt crystallization of a semicrystalline polymer having an incorporated fluorophore, the method comprising: changing a temperature of the semicrystalline polymer to vary across a range of temperatures comprising a plurality of temperatures; capturing an emission spectrum of the incorporated fluorophore at each temperature of the plurality of temperatures; integrating each emission spectrum to determine a temperature-dependent integrated fluorescence intensity for the semicrystalline polymer; numerically differentiating the temperature-dependent integrated fluorescence intensity; and characterizing the melting transition of the semicrystalline polymer by identifying a stepwise change in value of the differentiated intensity.

In some embodiments, the melting transition is melt crystallization.

In certain embodiments, the semicrystalline polymer is a thermoplastic. In some embodiments, the semicrystalline polymer comprises at least one of polyethylene, polypropylene, poly(L-lactic acid) (PLLA), poly(caprolactone) (PCL), and poly(ethylene oxide) (PEO), In some embodiments, incorporating the fluorophore into the semicrystalline polymer comprises physically doping the semicrystalline polymer with the fluorophore. In other embodiments, the fluorophore into the semicrystalline polymer comprises covalently labeling the semicrystalline polymer with the fluorophore. In some embodiments, the fluorophore comprises 1,2-bis(2,4-dihydrobenzylidene) hydrazine.

In certain embodiments, capturing an emission spectrum of the incorporated fluorophore comprises placing the semicrystalline polymer with incorporated fluorophore on a quartz slide.

In some embodiments, the melt crystallization is observed in a temperature range of 195° C. to 60° C. or any subset range within the 195° C. and 60° C. range.

BRIEF DESCRIPTION OF THE DRAWINGS

FIG. 3A illustrates testing a film substrate on a quartz slide in a spectrofluorometer. FIG. 3B compiles the representative fluorescent images of a 1030-nm-thick film of semicrystalline CN-PLLA at 130, 150, 170, and 190° C. FIG. 3C FIG. 3C quantitatively demonstrates a decrease in fluorescence intensity with increasing T because of enhanced intramolecular motions at higher T. FIG. 3D shows the T-dependence of the integrated fluorescence intensity under the emission spectra in FIG. 3C.

FIG. 18B Normalized fluorescence peak intensity $I_p$ at 75° C. in FIG. 11; FIG. 18C Absolute value of the slope of $I_p(T)$ in the T range between 75 and 80° C. in FIG. 3A, i.e., the plateau $I_p'$ values in the T range between 75 and 80° C. in FIG. 11; and FIG. 18D Integrated area under the melt crystallization peak on the $I_p'(T)$ curve in FIG. 15A, i.e., the stepwise change in $I_p$ due to crystallization in FIG. 11. Note the background color gradient represents the shift from primarily α' (light) to primarily α (darker) PLLA crystal form as cooling rate decreases. Each data point is colored to match with its respective cooling rate.

DETAILED DESCRIPTION

Figures 1, 2:
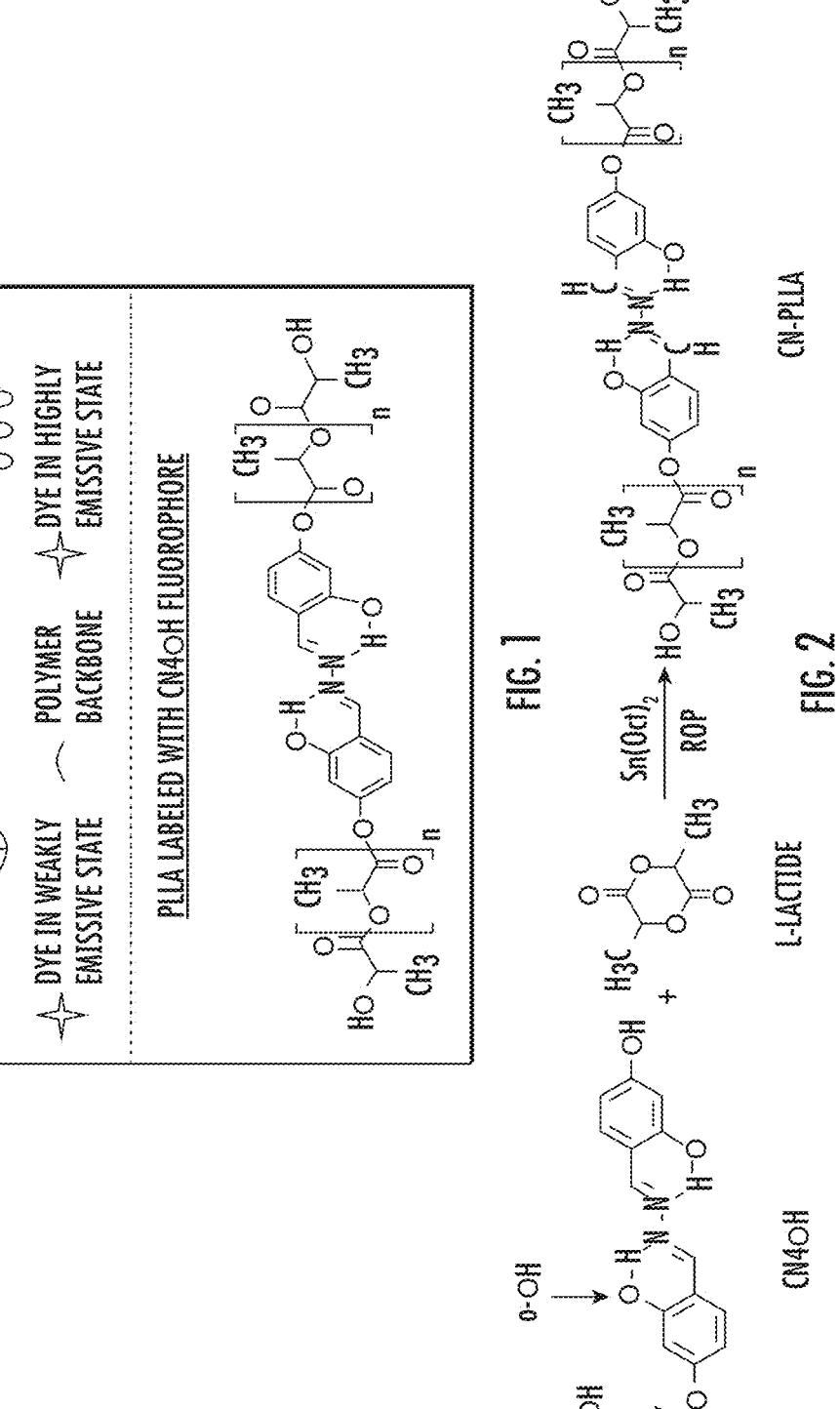
FIG. 1 illustrates one proposed mechanism for using fluorescence to monitor the melting and crystallization processes of semicrystalline polymers (e.g., PLLA) covalently labeled with a fluorophore (e.g., $CN_4OH$) that can sense the degree of crystallinity change. $T_c$ in this figure stands for crystallization temperature.
FIG. 2 is a schematic representation of the ring opening polymerization of L-lactide, initiated by the p-OH groups of $CN_4OH$.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Contemplated herein is a method for characterizing a melting transition in a semicrystalline polymer, both in bulk and thin film geometries, using fluorescence. This method is advantageous over conventional characterization methods because it can provide high sensitivity, easy implementation, and quick results. Additionally, the contemplated method does not require substantial modification of the material being investigated, exposure to potentially damaging materials or energies, or even direct contact with the material.

The contemplated method has been shown to be accurate, with melting point determinations falling within the margin of error of melting points measured using conventional differential scanning calorimetry. According to various embodiments, the contemplated method includes the incorporation of a fluorophore into the semicrystalline polymer of interest, and then observing the fluorescence emission spectra over a range of temperatures. As will be discussed in greater detail below, the area under each fluorescence emission spectrum at each temperature value is integrated to obtain integrated intensity vs. temperature data. This integrated intensity data is then numerically differentiated, revealing the melting transitions, according to some embodiments.

The contemplated method is not limited to spatially averaged properties like some of the conventional methods, according to various embodiments. A unique advantage of the contemplated fluorescence-based method is that it may be used to perform novel, location-specific melting point investigations within nanoscale regions. These characterizations cannot be easily performed with conventional techniques such as differential scanning calorimetry (DSC), ellipsometry, and X-ray based methods which only measure spatially averaged properties throughout a film cross section or an entire bulk sample. In stark contrast, with fluorescently labeled or doped polymers, it is possible to investigate the $T_m$ behavior in a local environment within more complex heterogeneous polymeric systems such as multilayer films, blends, and composites.

The method contemplated herein is directed to characterizing the melting transition in a semicrystalline polymer. For example, according to some embodiments, this method may be used to characterize the melting point of a polycrystalline thermoplastic. Examples include, but are not limited to, polyethylene, polypropylene, poly(L-lactic acid) (PLLA), poly(caprolactone) (PCL), poly(ethylene oxide) (PEO), and the like. While much of the following disclosure is done in the context of non-limiting examples of the method being applied to a polycrystalline thermoplastic, it should be noted that other embodiments of the contemplated method may be adapted for use with other polycrystalline polymers.

FIG. 1 illustrates the mechanism by which the contemplated method operates. Specifically, this characterization is made possible by taking advantage of how the mobility of the fluorophore influences its emission spectrum. When the polymer matrix is in the semicrystalline state, the crystalline structures impose effective restrictions on the intramolecular motions of fluorophores (e.g., rotations, which are nonradiative energy decay pathways from the excited state), resulting in a strong fluorescence emission (which is radiative energy decay from the excited state). In contrast, when the polymer matrix is in the amorphous state, the fluorophores are surrounded by random and more mobile chain segments and therefore experience less restriction on their intramolecular motions, leading to a weak fluorescence emission. Using the temperature dependence of the resulting emission spectrum, it is possible to characterize the melting transition.

The contemplated method may employ a variety of fluorophores. For example, in some embodiments the fluorophore may exhibit aggregation-induced emission, while in other embodiments it may exhibit aggregation-caused quenching effects. Examples of fluorescent probes include, but are not limited to, $CN_4OH$, TPE, and pyrene. According to various embodiments, fluorophores having aggregation-induced emission (AIE) properties such as 1,2-bis (2,4-dihydroxybenzylidene) hydrazine ($CN_4OH$), may be used in the contemplated method for characterizing the melting transition, as they have demonstrated sensitivity to the degree of crystallinity in a semicrystalline thermoplastic Aggregation-induced emission luminogens, including $CN_4OH$ and 1,1,2,2-tetraphenylethene (TPE), are of interest due to their unique advantages such as high solid-state emission, good thermal stability, and fast responsiveness.

The fluorophore is incorporated into the polymer before characterization. In some embodiments, the fluorophore may be incorporated by covalent labeling, while in other embodiments physical doping may be used. Hydrazine ($CN_4OH$) may be incorporated using either method. Hydrazine ($CN_4OH$) is attractive as a fluorescent label because it can be molecularly incorporated into biocompatible and biodegradable (or more sustainable) plastics, including PLLA and PCL, via a simple ring opening polymerization (ROP).

FIG. 2 is a schematic representation of the ring opening polymerization of L-lactide, initiated by the p-OH groups of $CN_4OH$. When $CN_4OH$ is covalently labeled onto PLLA, its temperature-dependent fluorescence intensity demonstrates great sensitivity to the melting transition of the polymer matrix, according to various embodiments. In other embodiments, other fluorophores may be used for covalent labeling. Alternatively, $CN_4OH$ can be physically doped into a given semicrystalline polymer (e.g., PLLA, PCL, PEO, etc.) while maintaining its ability to detect melting points.

Examples

Materials

Solvents, including N,N'-dimethylformamide (DMF, 99.99%), toluene (99.8% anhydrous), methanol (99.8%), hexane (99%), isopropanol (99.5%) and chloroform (99.8%), were obtained from either Oakwood Chemical or Sigma-Aldrich and used as received. L-lactide (98%, Alfa Aesar) was recrystallized prior to use. Tin(II) 2-ethyl-hexanoate ($Sn(Oct)_2$, 92.5-100%, Sigma-Aldrich) was used as received. $CN_4OH$ fluorescent dyes were synthesized and purified. Commercial semicrystalline PLLA (Sigma-Aldrich) was dissolved/precipitated three times in hot chloroform/methanol to remove any additives prior to use.

Synthesis of $CN_4OH$ Florescent Dye

The following is a specific, non-limiting example of the synthesis of $CN_4OH$ fluorescent dye, for use in the contemplated method. 2,4-dihydroxybenzaldehyde (e.g., 9500 mg, 67.41 mmol) and hydrazine monohydrate (e.g., 1600 mg, 31.96 mmol) are first individually dissolved in ethanol (e.g., 125 mL each). The hydrazine monohydrate/ethanol solution is then added dropwise to the 2,4-dihydroxybenzaldehyde/ethanol solution under vigorous stirring at room temperature. After addition, the obtained mixture is allowed to further react at room temperature overnight. After the reaction, the precipitate is collected by vacuum filtration and then washed with ethanol three times (e.g., 3×300 mL), followed by vacuum drying at 80° C. for 24 hours to yield final $CN_4OH$ fluorescent dye, a yellow solid.

Incorporation of $CN_4OH$ into Semicrystalline Polymer

As previously mentioned, $CN_4OH$ may be incorporated into the semicrystalline polymer to be characterized through covalent labeling, as well as through physical doping. Continuing with the specific, non-limiting example, in one embodiment $CN_4OH$-labeled PLLA (CN-PLLA) is prepared via ring opening polymerization of L-lactide, with $CN_4OH$ and $Sn(Oct)_2$ serving as initiator and catalyst, respectively. The polymerization scheme is illustrated in FIG. 2. In a typical ring opening polymerization, L-lactide (e.g., 5000 mg, 34.69 mmol), $CN_4OH$ (e.g., 50 mg, 0.18 mmol), and $Sn(Oct)_2$ (e.g., 75 mg, 0.18 mmol) at desired molar ratios (e.g., L-lactide:$CN_4OH$:$Sn(Oct)_2$=190:1:1) are co-dissolved in a DMF/toluene (vol/vol=1/10) solvent mixture (e.g., 25 mL) in a 150 mL pre-dried pressure reaction vessel (e.g., Chemglass). The molar ratio of $Sn(Oct)_2$ and $CN_4OH$ is kept at 1:1 to preserve the o-OH groups in $CN_4OH$. The reaction mixture is stirred at 110° C. for 18 h, followed by precipitation into excess hexane. The precipitant is then dissolved/precipitated two times in hot toluene (containing a few drops of DMF)/isopropanol, collected by vacuum filtration, and finally dried under vacuum at 100° C. for 24 h to yield the CN-PLLA product, a white solid. In preparation for the characterization, single-layer CN-PLLA films are prepared by dissolving the polymer in toluene at 100° C. and then spin coating the solution onto Si wafers with native oxide layer for film thickness determination, and colorless, transparent quartz slides for fluorescence measurement, respectively.

Preparation of Dye-Doped Polymer

Similarly, dye-doped polymer (i.e., PLLA, PCL, and PEO) films may be prepared by co-dissolving the corresponding polymer and a prescribed amount of fluorescent probes (i.e., ~1 wt % of the neat polymer) in solvents, followed by spin coating. As a specific non-limiting example, a DMF/toluene (vol/vol=1/10) solvent mixture is used to dissolve PLLA (or PCL) and $CN_4OH$ simultaneously, while a DMF/chloroform (vol/vol=1/10) solvent mixture may be used to dissolve PEO and $CN_4OH$ simultaneously.

According to various embodiments, semicrystalline PLLA films (both dye-labeled and dye-doped) may be obtained by heating the spin-coated samples at 190° C. (i.e., above $T_m$) for 5 minutes to completely melt all the crystals, and then at 125° C. (i.e., below $T_m$) for 8 h under vacuum to induce crystallization. Similarly, semicrystalline PCL and PEO films may be obtained by annealing the spin-coated samples at 140° C. for 5 min to completely melt all the crystals and then 46° C. for 8 h under vacuum to induce crystallization.

Characterization and Collection of Emission Spectra

After the fluorophore has been incorporated into the polymer, the fluorescence measurements are performed. The emission spectra are collected at a plurality of temperatures ranging across what is anticipated to be the melting point. Continuing with the specific, non-limiting example, in one embodiment, fluorescence measurements are performed on both dye-labeled and dye-doped semicrystalline polymer films supported on quartz slides using a Nanolog Steady State Spectrofluorometer (i.e., Horiba). As an option, 2 nm bandpass excitation and 2 nm bandpass emission slits are used.

When $CN_4OH$ fluorescent dyes are used, an excitation wavelength of 365 nm may be chosen, and the emission spectra may be collected between 460 and 590 nm. When TPE fluorescent dyes are used, an excitation wavelength of 360 nm may be chosen and the emission spectra may be collected between 380 and 550 nm. Finally, when pyrene fluorescent dyes are involved, an excitation wavelength of 324 nm may be chosen and the emission spectra may be collected between 360 and 415 nm. Fluorescent images at different temperatures (i.e., 130, 150, 170, and 190° C.) are obtained using a digital camera. Those skilled in the art will note that other wavelengths and spectra ranges may be used with other fluorophores.

These emission wavelength ranges are chosen to best capture the intensity peaks on the fluorescence spectra. Fluorescence emission spectra of dye-labeled and dye-doped semicrystalline polymer films are measured as a function of T during heating. As a specific example, the heating may be at 1° C. $min^{-1}$ on an Instec heating stage with a precise T control within ±0.1° C. In some embodiments, all the spectra are measured well above $T_g$ (i.e., $T_g$~-60° C. for PLLA, $T_g$~-60° C. for PCL, and $T_g$~-65° C. for PEO, respectively) to avoid any possible effects of physical aging on the peak intensity change during fluorescence $T_m$ measurements.

These spectra are collected every 1 min, and the area under each fluorescence emission spectrum at each T value is integrated to obtain integrated intensity (I) vs. T data. The resulting I(T) data is then numerically differentiated to better characterize the melting transitions. In the specific example from above, at least three fluorescence measurements are performed on each sample, based on which the experimental errors associated with $T_m$ characterizations were estimated.

According to various embodiments, covalent attachment of $CN_4OH$ fluorescent labels to PLLA chains is accomplished using $CN_4OH$ to initiate ring opening polymerization (ROP) of L-lactide at 110° C. (see FIG. 2), resulting in $CN_4OH$-labeled PLLA (hereinafter referred to as CN-PLLA). It is worth noting that the p-OH groups of $CN_4OH$ are expected to function as initiating sites for ROP whereas the o-OH groups remain intact during ROP and act as hydrogen bonding sites to form the enolimine rings required for the fluorescence behavior of the synthesized CN-PLLA. According to various embodiments, and as shown in FIG. 2, each CN-PLLA chain would contain one $CN_4OH$ dye segment; the label content is estimated to be ~3.3 wt % based on the CN-PLLA molecular weight (i.e., $M_n$~8.5 kg $mol^{-1}$). These $CN_4OH$ labels should be uniformly distributed in the PLLA matrix without the formation of large aggregates since the x-ray diffraction results for CN-PLLA have shown no diffraction peaks from neat CN$_4$OH. Single-layer CN-PLLA films may then be prepared by dissolving the polymer in toluene at 100° C. and then spin coating the solution onto quartz slides for fluorescence measurement and Si wafers for film thickness determination, respectively. Prior to fluorescence experiments, all CN-PLLA films were crystallized at 125° C. under vacuum for 8 h, according to various embodiments.

Continuing with the specific non-limiting example, the resulting semicrystalline CN-PLLA films supported on quartz slides are then mounted on a heating stage and placed into a spectrofluorometer (e.g., Nanolog Steady State Spectrofluorometer) as shown in FIG. 3A. The CN$_4$OH labels are excited at a wavelength of 365 nm. FIG. 3B compiles the representative fluorescent images of a 1030-nm-thick film of semicrystalline CN-PLLA at 130, 150, 170, and 190° C. As shown qualitatively in FIG. 3B, the fluorescence intensity or brightness decreases with increasing temperature. This is consistent with the working mechanism, i.e., the restriction of intramolecular motion (RIM), of these types of AIE luminogens including CN$_4$OH. At low temperatures, the intramolecular motions of AIE luminogens (e.g., rotations and vibrations, which are nonradiative means of energy decay from the excited state) are restricted in a relatively rigid local environment and therefore exhibit strong fluorescence (i.e., a radiative means of energy decay). At high temperatures, the rigidity of the local environment is lowered and thereby the intramolecular motions of AIE luminogens are enhanced, promoting nonradiative energy decay pathways, and thus suppressing radiative fluorescence emission (i.e., decreased light intensity or brightness).

After the emissions spectra have been collected for various temperatures, they are integrated to yield a temperature-dependent integrated fluorescence intensity. Returning to the specific, non-limiting example, FIG. 3C compiles the T-dependent fluorescence emission spectra collected using the emission detector in the 460-590 nm range for the same semicrystalline CN-PLLA film shown in FIG. 3B. These spectra were collected every minute during 1° C. min' heating from 115 to 195° C. FIG. 3C quantitatively demonstrates a decrease in fluorescence intensity with increasing T because of enhanced intramolecular motions at higher T, as discussed above.

FIG. 3D shows the T-dependence of the integrated fluorescence intensity under the emission spectra in FIG. 3C. In this specific, non-limiting example, the integrated intensity at each T is normalized by the value at 115° C. According to FIG. 3D, as T increases, the intensity initially decreases almost linearly from 1 at 115° C. to ~0.7 at ~150° C., then starts to deviate from this linear change at ~150° C. and undergoes a sudden, continuous drop to ~0.4 at ~175° C., and finally exhibits a nearly linear decrease again above 180° C. The stepwise decrease in the fluorescence intensity I(T) data between 150 and 175° C. (FIG. 3D) is associated with the melting transition process of semicrystalline CN-PLLA.

Figure 4:
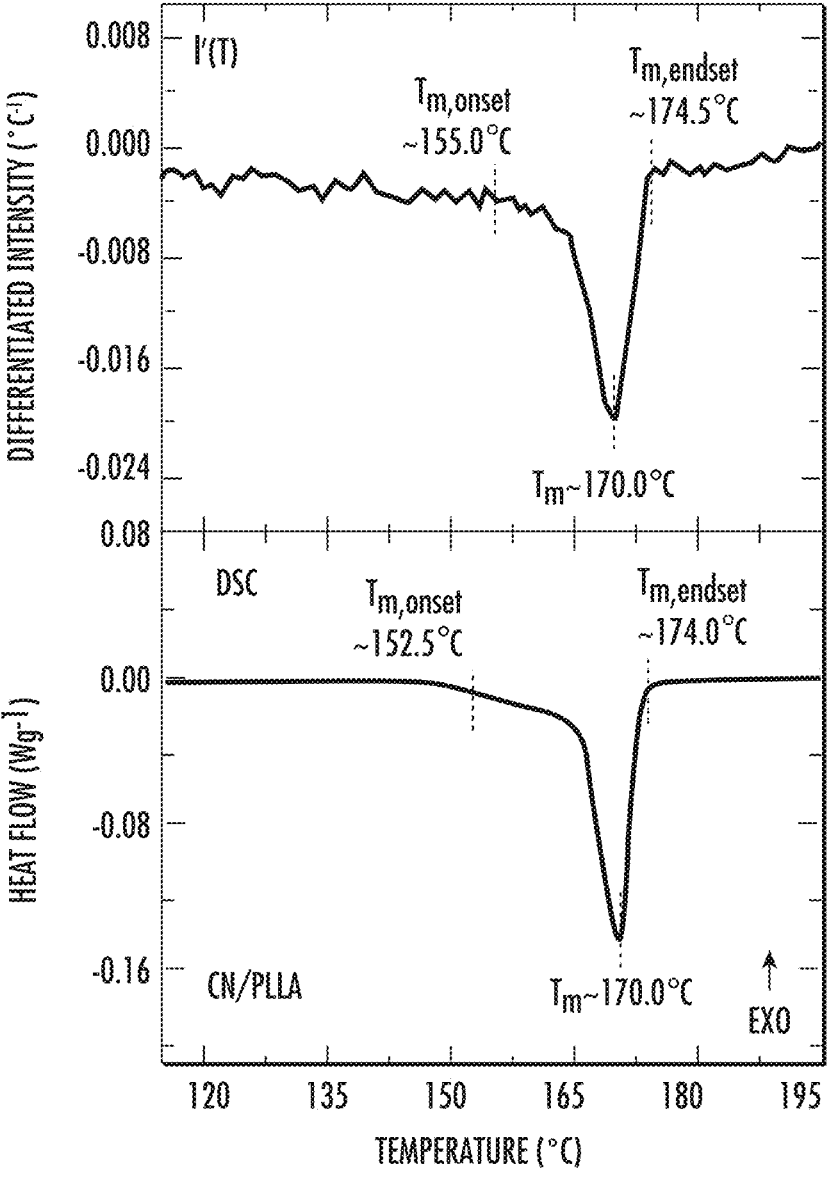
FIG. 4 shows: (A) $I_p(T)$ data after normalizing to the value at 195° C. and (B) Corresponding $I_p'(T)$ data in absolute values collected during nonisothermal crystallization of CN-PLLA at various cooling rates ranging from 1 to 64° C. $min^{-1}$.

According to various embodiments, the I(T) data (e.g., FIG. 3D, etc.) is then numerically differentiated to characterize the melting transition process of the polymer. This numerical differentiation is based on the equation below, which is somewhat analogous to a method for determining the thermal expansivity from thickness as a function of temperature:

$$I'(T)=[I(T+\Delta T/2)-I(T-\Delta T/2)]/[I(T_0)\times\Delta T]$$

where I' denotes the first derivative of I, $T_0$ is a reference temperature selected as the lowest T at which the fluorescence spectrum was collected in some embodiments (e.g., 115° C. for semicrystalline CN-PLLA), $I(T_0)$ is the integrated intensity of the fluorescence spectrum collected at $T_0$, and $\Delta T$ is the temperature interval of differentiation, (e.g., here selected as ~4° C.). The resulting first derivative I'(T) data is shown in FIG. 4.

With the first derivative curve, the melting transition region is apparent in the deviations from the baseline. This derivative approach can provide greater sensitivity to the underlying melting transition than direct use of the I(T) data. Values of $T_{m,onset}$, $T_m$, and $T_{m,endset}$ are defined in FIG. 4 (Top) as the onset of the melting transition (i.e., the temperature at which the first crystal starts to melt), peak melting temperature (i.e., the melting point), and endset of the melting transition (i.e., temperature at which the last trace of crystallinity is melted) as detected by fluorescence, respectively. Exemplary values for $T_{m,onset}$, $T_m$, and $T_{m,endset}$ characterized by fluorescence are compiled in Table 1, alongside values for those same temperatures as determined using a conventional method, DSC. As can be seen in FIG. 4 and Table 1, the values obtained using the contemplated method are consistent with those obtained using the conventional DSC method.

TABLE 1

| Sample Name | Fluorescence Measurement (±1.5° C.) | | | DSC Measurement (±1° C.) | | |
|---|---|---|---|---|---|---|
| | $T_{m, onset}$ | $T_m$ | $T_{m, endset}$ | $T_{m, onset}$ | $T_m$ | $T_{m, endset}$ |
| CN-PLLA | 151.5 | 165.5 | 172.0 | 151.5 | 167.0 | 169.5 |
| CN/PLLA | 155.0 | 170.0 | 174.5 | 152.5 | 170.0 | 174.0 |
| CN/PCL | 51.5 | 58.5 | 62.5 | 50.5 | 60.0 | 61.0 |
| CN/PEO | 55.5 | 63.0 | 67.0 | 55.0 | 62.5 | 64.5 |
| TPE/PCL | 49.0 | 58.5 | 62.0 | 50.0 | 60.0 | 61.0 |
| Pyrene/PCL | 51.5 | 60.0 | 64.0 | 50.5 | 60.0 | 61.5 |

As shown in both FIG. 4 (Top) and Table 1, in this specific non-limiting example, the melting transition as characterized on the I'(T) curve starts at $T_{m,onset}=151.5$ (±1.5) ° C., then exhibits a minimum at $T_m=165.5$ (±1.5) ° C., and finally ends at $T_{m,endset}=172.0$ (±1.5) ° C. It is worth noting that the baseline values on the I'(T) curve roughly increased from ~~0.008 to ~−0.004° C.$^{-1}$ after melting, indicating that the fluorescence intensity of CN-PLLA exhibits a greater sensitivity to thermal expansion in the semicrystalline state than in the amorphous state.

Overall, the fluorescence-based method contemplated herein may provide an easy and contact-free melting point characterization approach that is suitable for various sample geometries (e.g., bulk samples, thin/ultrathin films, etc.). The use of fluorescent labels is advantageous because it may allow for novel location-specific investigations that cannot be easily performed with conventional techniques such as DSC, ellipsometry, and X-ray based methods which only measure spatially averaged properties throughout a film cross section or an entire bulk sample. For example, with fluorescently labeled polymers, it may be possible to investigate the $T_m$ behavior in a local environment within more complex heterogeneous polymeric systems such as multi-layer films, blends, and composites.

As previously mentioned, in some embodiments, the semicrystalline polymer may be physically doped, rather than covalently labeled. In a specific, non-limiting example, CN$_4$OH was physically doped into a commercial unlabeled PLLA ($M_n$~140 kg mol$^{-1}$) at roughly 1 wt % of the neat polymer. X-ray diffraction results for the obtained CN$_4$OH-doped PLLA (hereinafter referred to as CN/PLLA) indicate that the dye dopants dispersion within the PLLA is substantially uniform. Films of CN/PLLA films are prepared via spin coating and subsequently crystallized at 125° C. under vacuum for 8 hours before taking fluorescence and conventional DSC measurements at a heating rate of 1° C. min$^{-1}$.

FIG. 4 displays the I'(T) data (Top) for a 1080-nm-thick semicrystalline CN/PLLA film and the corresponding DSC thermogram (Bottom) of the same CN/PLLA sample at an identical heating rate of 1° C. min$^{-1}$. According to FIG. 4 (Top), the melting transition as characterized on the I'(T) curve starts at $T_{m,onset}$=155.0 (±1.5) ° C., then exhibits a minimum at $T_m$=170.0 (±1.5) ° C., and finally ends at $T_{m,endset}$=174.5 (±1.5) ° C., in reasonable agreement with the DSC characterization shown in FIG. 4 (Bottom) and Table 1. According to various embodiments, the fluorescence from freely doped AIE luminogens such as CN$_4$OH exhibits good sensitivity to the change in molecular-scale environmental conditions during the melting transition.

Advantageously, this physical doping technique is more straightforward, as it does not require the additional syntheses needed to covalently label a polymer, and thereby facilitate a more convenient determination of the melting point of a given semicrystalline polymer. In addition, the incorporation of fluorescent dopants at a trace level does not significantly alter the melting behavior of the parent polymer, e.g., the $T_m$ values determined by DSC for neat PLLA and CN/PLLA containing ~1 wt % CN$_4$OH are within error the same.

It is worth noting that freely doped fluorescent probes may sublime at elevated temperatures for a long time, rendering the use of fluorescence intensities to sense melting transitions less effective under certain conditions. Nonetheless, it has been demonstrated that the fluorescence response of AIE luminogens such as CN$_4$OH, either added as dopants or covalent labels, can be used to sense the melting transition in semicrystalline PLLA, through a stepwise decrease in the T-dependence of fluorescence intensity, I(T), and a negative peak in the T-dependence of the first derivative of fluorescence intensity, I'(T), respectively.

Figure 5B:
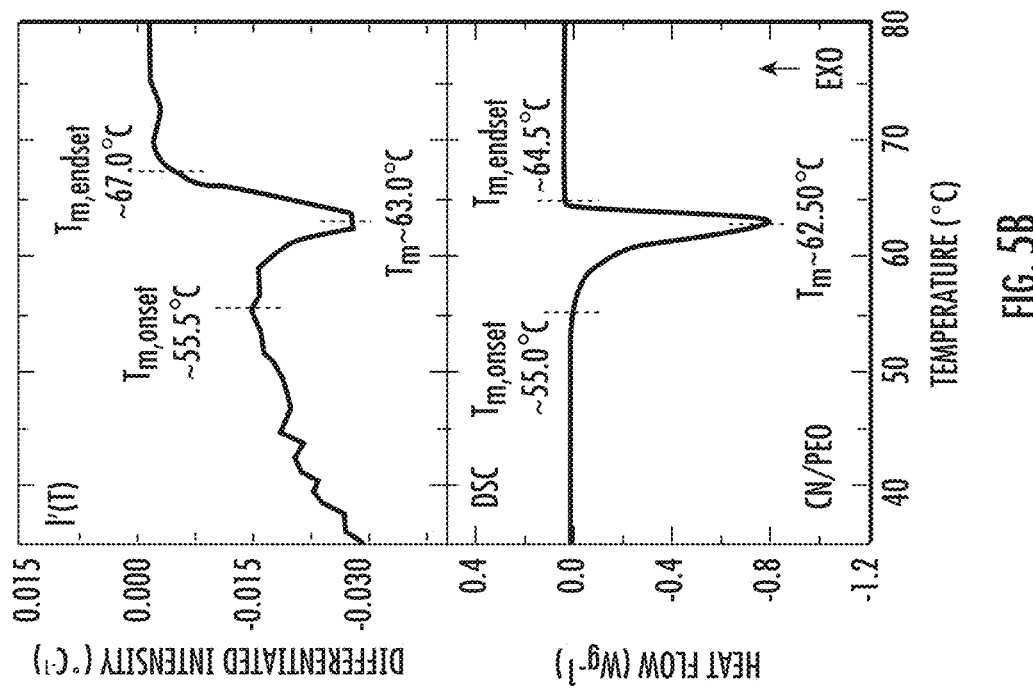
FIGS. 5A and 5B show results obtained using the instantly disclosed method, as well as the conventional DSC method, for polycrystalline polymers with incorporated fluorophores.
Figure 5A:
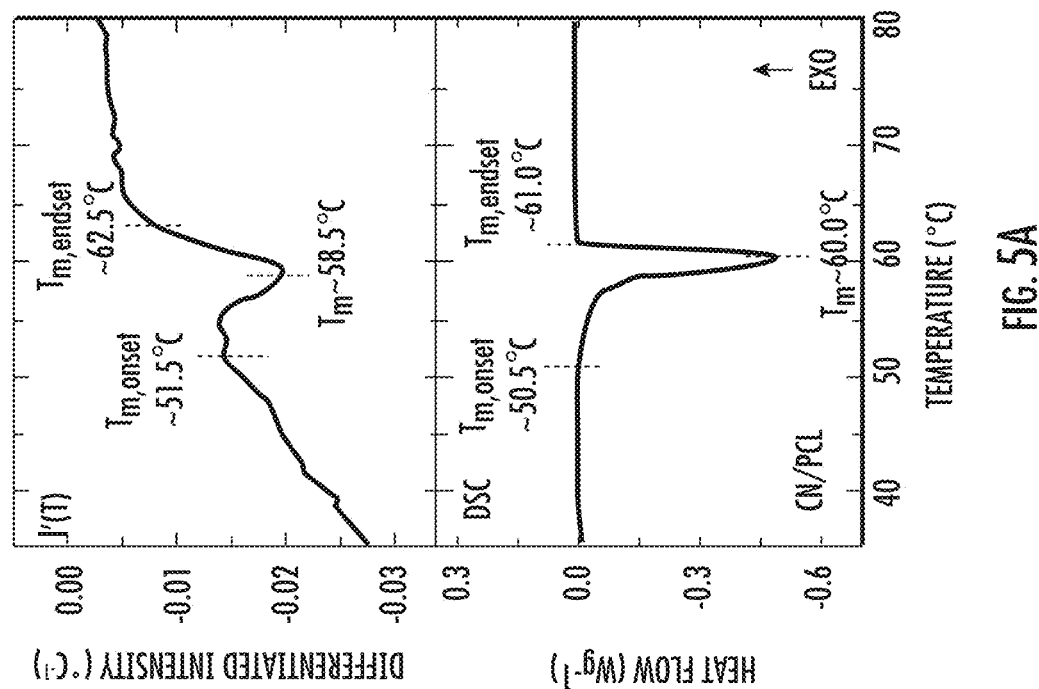

FIGS. 5A-5B show results obtained using the contemplated method, as well as the conventional DSC method, for other polycrystalline polymers with incorporated fluorophores. Specifically, FIG. 5A shows the results for doped polycaprolactone (hereinafter CN/PCL), and FIG. 5B shows the results for doped poly(ethylene oxide) (hereinafter CN/PEO). In a specific, non-limiting embodiment, these polymers were doped using ~1 wt % of CN$_4$OH. The resulting CN/PCL and CN/PEO samples were crystallized at 46° C. for 8 hours before taking fluorescence and DSC measurements at a heating rate of 1° C. min$^{-1}$.

FIGS. 5A and 5B display the combined I'(T) curves and DSC thermograms for a 1100-nm-thick CN/PCL film and a 1050-nm-thick CN/PEO film, respectively. For the semicrystalline CN/PCL sample, both fluorescence and DSC plots exhibited a melting peak centered at ~60° C. Similarly, for the semicrystalline CN/PEO sample, both fluorescence and DSC plots showed a melting peak centered at ~63° C. It should be noted, the incorporation of ~1 wt % of CN$_4$OH had negligible or limited effects on the melting transitions of neat PCL and PEO, according to DSC characterizations. The excellent agreement between the melting point determinations by fluorescence and DSC for both CN/PCL and CN/PEO in FIGS. 5A-5B demonstrate that the contemplated fluorescence-based method could potentially be generalized to a wide range of semicrystalline polymers.

According to some embodiments, the fluorophore may be CN$_4$OH. In other embodiments, the fluorophore may be another dye or compound. For example, TPE is another well-known AIE luminogen which contains an olefin stator surrounded by phenyl rotors. It follows a similar restriction of intramolecular rotation fluorescence mechanism (see FIG. 6A). In contrast, pyrene is a conventional fluorophore with planar structures that exhibits an "aggregation-caused quenching" (ACQ) effect due to its tendency to form excimers or exciplexes in the aggregated state (see FIG. 6B). Both TPE and pyrene fluorophores have been shown to exhibit great sensitivity to their local surrounding environment. Demonstrating their sensitivity to melting transition, ~1 wt % of TPE and pyrene were physically incorporated into neat PCL to obtain both TPE-doped PCL (noted as TPE/PCL) and pyrene-doped PCL (noted as pyrene/PCL). Similarly, the resulting TPE/PCL and pyrene/PCL samples were crystallized at 46° C. for 8 h before taking fluorescence and DSC measurements at 1° C. min$^{-1}$. Semicrystalline PCL may be chosen as the polymer matrix because of its relatively low melting point, which could help avoid possible dye sublimation (especially for pyrene) at higher temperatures, according to various embodiments.

Figure 6B:
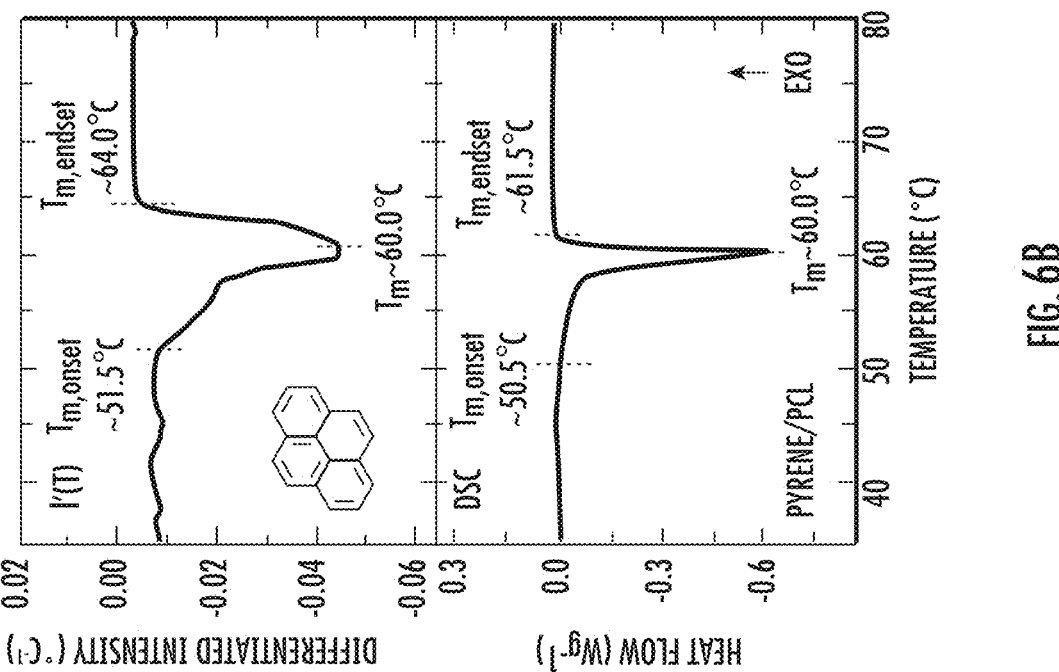
FIGS. 6A and 6B display the combined I'(T) curves and DSC thermograms for a specific, non-limiting example of the contemplated method applied to a 1210-nm-thick TPE/PCL film and a 1020-nm-thick pyrene/PCL film, respectively.
Figure 6A:
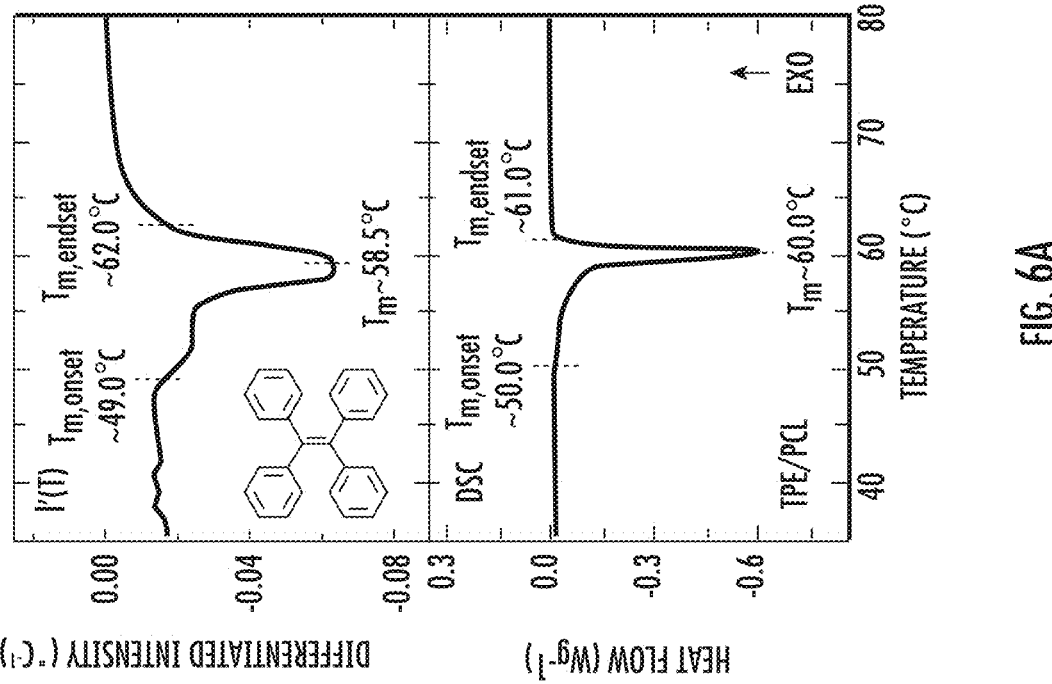

FIG. 6A and FIG. 6B display the combined I'(T) curves and DSC thermograms for a specific, non-limiting example of the contemplated method applied to a 1210-nm-thick TPE/PCL film and a 1020-nm-thick pyrene/PCL film, respectively. For the semicrystalline TPE/PCL sample, both fluorescence and DSC plots exhibit a melting peak centered at ~60° C. Similarly, for the semicrystalline pyrene/PCL sample, both fluorescence and DSC plots show a melting peak centered at ~60° C. It should be noted that the incorporation of ~1 wt % of TPE or pyrene had negligible effects on the melting transitions of neat PCL, according to DSC characterizations. The excellent agreement between the melting point determinations by fluorescence and conventional DSC for both TPE/PCL and pyrene/PCL in FIGS. 6A-6B demonstrate that the contemplated fluorescence-based method can be applied with a variety of fluorescent probes (e.g., TPE, pyrene, CN$_4$OH, etc.) without losing substantial sensitivity.

Synthesis of CN$_4$OH-Labeled PLLA (i.e., CN-PLLA) Via Ring Opening Polymerization.

In a typical synthesis of CN-PLLA, L-lactide (monomer: 4953 mg, 33.68 mmol), CN$_4$OH (initiator: 36.7 mg, 0.135 mmol), and Sn(Oct)$_2$ (catalyst: 56.7 mg, 0.135 mmol) at a molar ratio of L-lactide:CN$_4$OH:Sn(Oct)$_2$=250:1:1 were dissolved in a toluene/DMF (volume/volume=10/1) solvent mixture (33.4 mL) in an argon atmosphere. The solution was left at 110° C. to react for 78 h, and the resulting CN-PLLA was purified and dried to yield the final product (tan solid). Since each CN-PLLA chain contains one CN$_4$OH dye segment, the CN$_4$OH content within the synthesized CN-PLLA can be estimated as 1.5 wt % based on its overall molecular weight ($M_n$=18 kg mol$^{-1}$).

Preparation of CN$_4$OH-Containing Polymer Films.

Dye-labeled CN-PLLA films were prepared by dissolving the polymer in a toluene/DMF (volume/volume=10/1) solvent mixture at ~100° C. and then drop casting the solution onto transparent 1 mm thick quartz slides for fluorescence measurement. Similarly, CN$_4$OH dye-doped PLLA (i.e., CN$_4$OH/PLLA) films were prepared by co-dissolving the commercial neat PLLA and ~1 wt % CN$_4$OH (relative to PLLA) in a toluene/DMF (volume/volume=10/1) solvent mixture and drop casting the solution onto quartz slides. Both drop casting solutions were fixed at a concentration of 10 wt % solids. The as-obtained CN-PLLA and CN/PLLA films were heated at 120° C. for 12 h under dynamic vacuum to completely remove any residual solvent before fluorescence measurement. The thicknesses of all the films in this study were estimated using a micrometer to range from 30 to 50 μm. All the films in this study were intentionally kept relatively thick to avoid any potential confinement effects on the polymer crystallization behavior.

Characterizations 2.2.1 Size Exclusion Chromatography (SEC).

SEC analysis of the synthesized CN-PLLA was performed using a Waters Alliance e2695 system equipped with two Shodex KD-806M columns in series and a Waters 2414 refractive index detector. Specifically, SEC samples were analyzed at 35° C. in either a tetrahydrofuran or a chloroform mobile phase, at a flow rate of 1 mL min$^{-1}$. Number-average molecular weight ($M_n$), weight-average molecular weight ($M_w$), and dispersity Đ($M_w/M_n$) of the synthesized CN-PLLA were determined using monodisperse commercial polystyrene calibration standards, and the results are $M_n$=18 kg mol$^{-1}$, $M_w$=26 kg mol$^{-1}$, and Đ=1.4. As reported by the vendor, $M_n$=20 kg mol$^{-1}$, $M_w$=22 kg mol$^{-1}$, and Đ=1.1 for commercial PLLA.

2.2.2 X-Ray Diffraction (XRD) Characterization.

XRD measurements were performed on a powder X-ray diffractometer (Malvern PANalyticalAeris) equipped with a PIXcellD detector in a 2θ Bragg Brentano geometry. The XRD spectra were scanned in the 2θ range between 5-50° at a rate of 3.3° min$^{-1}$. No individual diffraction peaks corresponding to neat CN$_4$OH were detected on the XRD spectra of both CN-PLLA and CN/PLLA, indicating that CN$_4$OH dyes were homogeneously dispersed in the PLLA matrix. More importantly, the degrees of crystallinity for CN-PLLA samples right after nonisothermal melt crystallizations under different conditions were determined by measuring the ratio between the area of the deconvoluted crystalline peaks and the total area of the crystalline and amorphous peaks on the XRD spectra.

2.2.3 Fluorescence Characterizations of CN-PLLA and CN/PLLA Films.

T-dependent fluorescence behavior of both CN-PLLA and CN/PLLA films were measured using a Nanolog steady state spectrofluorometer (Horiba). The excitation slit size was fixed at 2 nm, while the emission slit size was adjusted between 2 and 10 nm to ensure desired fluorescence intensity. The excitation wavelength for these CN$_4$OH dye-containing films was fixed at 365 nm. Prior to fluorescence measurement, both CN-PLLA and CN/PLLA films were thermally annealed at 195° C. (well above $T_m$~165° C.) on an Instec heating stage (with a temperature control accuracy of 0.1° C.) for 5-10 min to melt all the crystals and reach a completely amorphous state. Nonisothermal melt crystallization behavior was examined by cooling these films from 195 to 60° C. at different cooling rates ranging from 1 to 64° C. min$^{-1}$, during which the T-dependent fluorescence data were collected in situ.

Both spectra and single-point fluorescence methods were employed for data collection. The traditional spectra method works reasonably well with nonisothermal melt crystallization studies at relatively slow cooling rates, e.g., 1, 2, and 4° C. min$^{-1}$, where the fluorescence emission spectra were collected in situ between 430 and 595 nm every 1° C. This wavelength range was chosen to best capture the fluorescence intensity peak on the emission spectra while ensuring enough time for fluorescence spectra collection during cooling. With this wavelength range, the collection of each fluorescence spectrum would take ~10 s; thus, the fastest cooling rate this spectra method could accommodate would be ~6° C. min$^{-1}$, if one wants to collect a fluorescence spectrum every 1° C. The area under the emission spectrum at each T was integrated to obtain integrated fluorescence intensity (I) vs. T data during nonisothermal melt crystallization at different cooling rates.

Our new single-point method works well with nonisothermal melt crystallization studies not only at slow but also fast cooling rates, e.g., 8, 16, 32, and 64° C. min$^{-1}$ With this method, the fluorescence peak intensity, i.e., the peak intensity at a single wavelength (520 nm) of the emission spectrum, was measured ~5 times per second continuously during cooling. The fluorescence peak intensity data measured during each 1° C. interval were numerically averaged to obtain the average peak intensity (noted as $I_p$) vs. T data. Compared to the traditional spectra method, this single-point method allows one to collect the representative fluorescence information of a sample at each T much more rapidly, enabling this single-point method to be employed for nonisothermal melt crystallization studies at much faster cooling rates without significantly sacrificing the single sensitivity. In our study, the maximum cooling rate is set by the cooling rate that can be reliably achieved by the Instec heating stage, i.e., ~100° C.

The I(T) and $I_p$(T) data were also numerically differentiated to obtain the first derivative I'(T) and $I_p$'(T) data of these films to reveal more details of the underlying nonisothermal melt crystallization process. This differentiation method is analogous to the one that has been previously used to determine T-dependent thermal expansion coefficient from the thickness vs. T data. For each nonisothermal melt crystallization experiment at a specific cooling rate, at least three fluorescence measurements were performed on each sample to ensure reproducibility and better examine the onset and endset of the melt crystallization process as well as the peak crystallization temperature. It is noteworthy that the $I_p$'(T) data obtained by the single-point method at relatively slow cooling rates (e.g., 1, 2, and 4° C. min$^{-1}$) were nearly identical to the I'(T) data obtained by the spectra method at the same cooling rates. This indicates that these two methods can probe the underlying T-dependent fluorescence behavior of the crystallizing polymeric matrix at an equal level of sensitivity.

Differential Scanning Calorimetry (DSC) Characterization.

DSC measurements were performed with a TA Discovery DSC2500 instrument on ~5 mg of sample sealed in an aluminum pan. Similarly, both CN-PLLA and CN/PLLA samples were thermally annealed at 195° C. for 5 min to melt all crystals and reach a completely amorphous state prior to cooling. Nonisothermal melt crystallization behavior was examined by cooling these samples from 195 to 40° C. at different cooling rates ranging from 1 to 32° C. min$^{-1}$, during which the T-dependent heat flow (related to enthalpy) was collected in situ. The nonisothermal crystallization appeared as an exothermic peak on the DSC thermogram obtained during the cooling ramp, from which the onset and endset of the melt crystallization process as well as the peak crystallization temperature were determined. It is noteworthy that the highest cooling rate this conventional DSC can reliably access is ~40° C. min' at this temperature range, much slower than that can be achieved with the fluorescence technique discussed above. In addition, the glass transition temperature ($T_g$) was determined on the second 10° C. min$^{-1}$ heating after annealing at 195° C. for 5 min to erase thermal history and quenching to –20° C. at 10° C. min$^{-1}$.

Thermogravimetric Analysis (TGA).

TGA experiments were performed using a TA TGA5500 Analyzer. Approximately 5 mg of sample was loaded into a platinum pan and heated to 600° C. at 10° C. min$^{-1}$ under nitrogen.

Results and Discussion

Nonisothermal Melt Crystallization Monitored by Fluorescence

Fluorescent $CN_4OH$ dye-labeled PLLA (noted as CN-PLLA) was synthesized via ring-opening polymerization, where $CN_4OH$ served as an initiator. The number-average molecular weight, $M_n$, of the resulting CN-PLLA was determined by SEC to be ~18 kg mol$^{-1}$. Since each CN-PLLA chain contains one $CN_4OH$ dye segment (i.e., initiator), the CN4OH dye label content within the synthesized CN-PLLA was estimated to be ~1.5 wt %. The uniform distribution of $CN_4OH$ labels within the PLLA matrix, without the formation of large aggregates, was confirmed by XRD.

Figure 7:
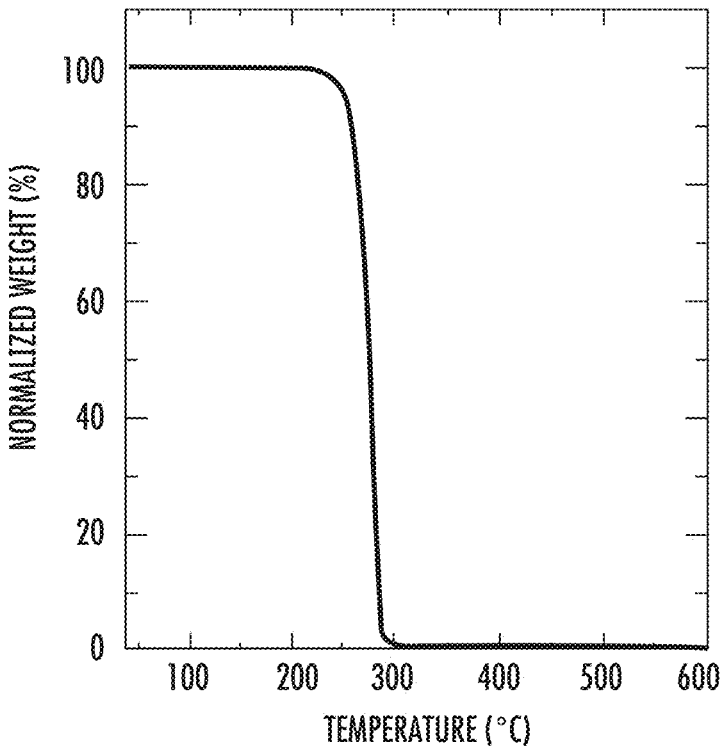
FIG. 7 presents results from thermogravimetric analysis (TGA) of the synthesized CN-PLLA during a heating ramp at 10° C. $min^{-1}$ in $N_2$ atmosphere ($T_{d,5\%} \sim 249°$ C.).

Bulk single-layer films of CN-PLLA were prepared for fluorescence measurement by drop casing the heated polymer and toluene/DMF solution (at ~100° C.) onto quartz slides, following by vacuum drying at 120° C. for 12 h to remove the residual solvent. The film thickness was intentionally kept at 30-50 μm by adjusting the polymer concentration, in order to avoid potential interfacial and/or confinement effects on the crystallization behavior in these drop cast CN-PLLA films. Prior to nonisothermal crystallization studies, all CN-PLLA films supported on quartz slides were annealed on an Instec heating stage at 195° C. for 5-10 min to melt the PLLA crystals to reach a completely amorphous state. It is noteworthy that CN-PLLA is thermally stable up to >200° C. according to TGA results (FIG. 7).

Figures 8A, 8B, 8C, 8D:
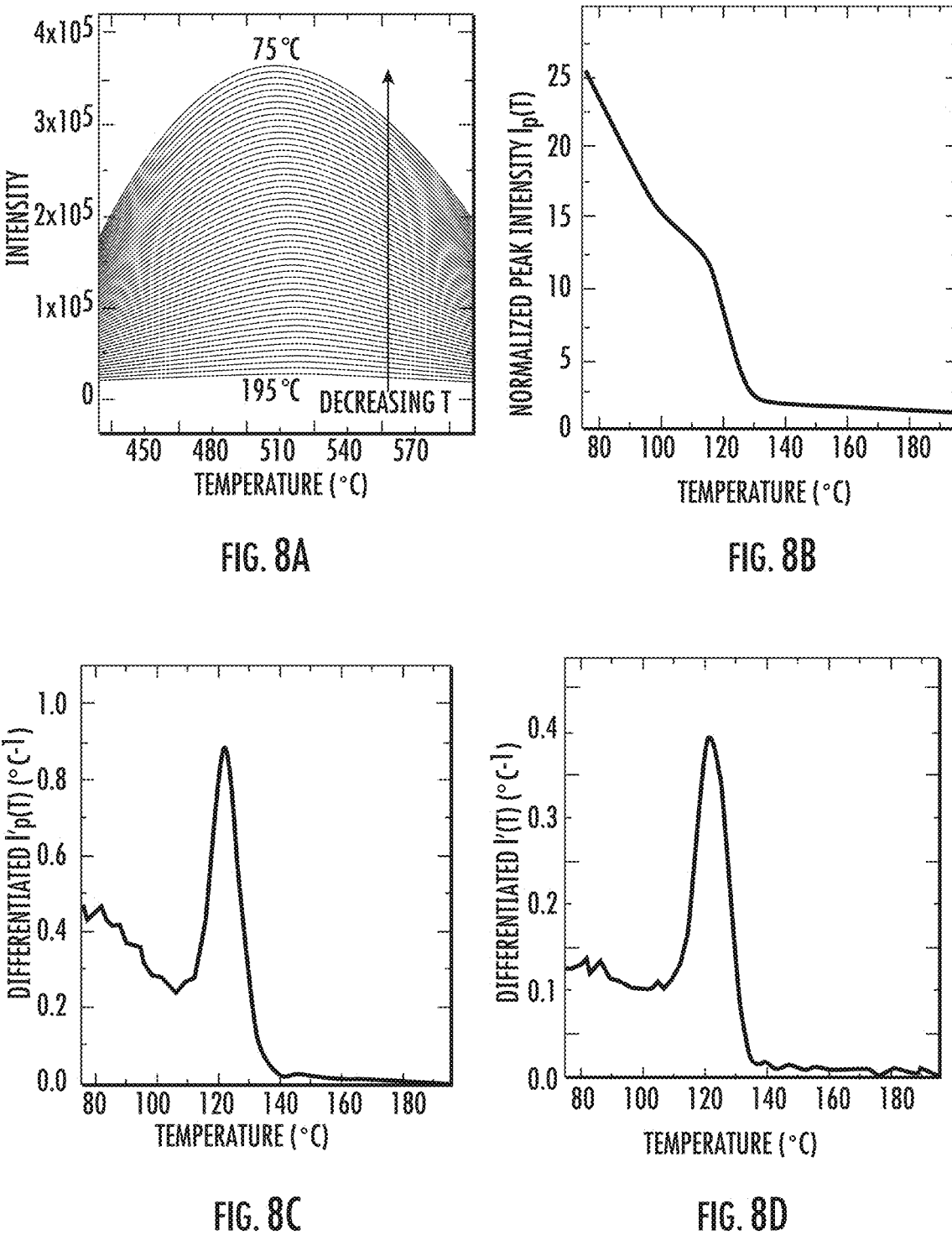
FIG. 8A shows T-dependent fluorescence emission spectra collected during nonisothermal crystallization of CN-PLLA at 2° C. $min^{-1}$ cooling.
FIG. 8B shows T-dependent fluorescence intensity at the emission peak wavelength ($I_p$) normalized to the value at 195° C.
FIG. 8C shows differentiated $I_p(T)$ data in (B), i.e., $I_p'(T)$.
FIG. 8D shows differentiated I(T) data, i.e., I'(T), where I(T) represents the T-dependent integrated fluorescence intensity under the emission spectra in (A). (Note: The derivative data in FIGS. 8B and 8D are in absolute values.)

The nonisothermal crystallization behavior of CN-PLLA was studied by monitoring its fluorescence behavior on a Nanolog Steady State Spectrofluorometer. For fluorescence characterizations, the excitation wavelength was fixed at 365 nm to excite the $CN_4OH$ dye labels. FIG. 8A shows the representative T-dependent fluorescence emission spectra in the 430-595 nm range (with a step size of 15 nm) for the CN-PLLA film during controlled cooling from 195° C. (i.e., completely amorphous state) to 75° C. at a rate of 2° C. min$^{-1}$. This emission wavelength range was chosen to best capture the intensity peak on the fluorescence spectra, and these spectra were collected every 1° C. According to FIG. 8A, all the fluorescence spectra exhibited a peak centered at ~515 nm, in agreement with the previous literature. In addition, the fluorescence intensity increased with decreasing T, which is consistent with their sensing mechanism, i.e., the intramolecular motions (e.g., rotations and vibrations) of these AIE $CN_4OH$ luminogens are increasingly restricted in a more rigid local environment and thus their fluorescence intensity is enhanced as T decreases.

It is noteworthy that each spectrum in FIG. 8A would require ~10 s to acquire. A simple calculation suggests that this fluorescence spectra method could access a maximum cooling rate of ~6° C. min$^{-1}$, if one wants to collect one fluorescence spectrum every 1° C. To enable nonisothermal crystallization studies at fast cooling rates via fluorescence, a single-point method was employed instead. With this method, the peak intensity at a single wavelength on the emission spectrum at ~520 nm, noted as $I_p$, was measured ~5 times per second and numerically averaged every 1° C. during cooling. Compared to the traditional spectra method, this single-point method allows one to collect the representative fluorescence information at each T much more rapidly, enabling nonisothermal melt crystallization studies at much faster cooling rates. Herein, the maximum cooling rate is not set by the scanning rate of our single-point method, but by the cooling rate that can be reliably achieved via the Instec heating stage, i.e., ~100° C. min$^{-1}$.

FIG. 8B shows the representative T-dependence of $I_p$ of CN-PLLA when cooling from 195 to 75° C. at 2° C. min$^{-1}$. The $I_p$ value at each T was normalized by the lowest value at 195° C., where CN-PLLA was in a completely amorphous state. According to FIG. 8B, as T decreases from 195° C., $I_p$ initially increases almost linearly from 1 at 195° C. to ~2.0 at ~137° C., then starts to deviate from this linear change at ~137° C. and undergoes a sharp, continuous increase to ~13.2 at ~108° C., and finally exhibits an almost linear increase again below 108° C. This step-like $I_p(T)$ function is similar to the one observed in our previous study, where the fluorescence intensity showed a step-like decrease after heating the semicrystalline CN-PLLA above its melting point $T_m$. Therefore, the stepwise increase in the $I_p(T)$ data between 137 and 108° C. shown in FIG. 8B can be attributed to the nonisothermal melt crystallization process of CN-PLLA which occurred during 2° C. min$^{-1}$ cooling.

To better investigate the underlying nonisothermal crystallization process, the $I_p(T)$ data in FIG. 8B were numerically differentiated by calculating the slope at each T via linear regression (data within T±2° C.). FIG. 8C shows the first derivative $I_p'(T)$ function obtained after numerical differentiation of the $I_p(T)$ data. As shown in FIG. 8C, the nonisothermal melt crystallization process is apparent by deviation from the baseline and shown as a peak. (It is noteworthy that the derivative data in FIGS. 8A-8D are in absolute values.) This derivative fluorescence approach can better reveal the underlying nonisothermal melt crystallization process, including the onset of crystallization (i.e., temperature at which the first crystal starts to form; noted as $T_{c,onset}$), peak crystallization temperature ($T_p$), and endset of crystallization (i.e., temperature at which the sample reaches its maximum crystallinity attainable at a specific cooling rate; noted as $T_{c,endset}$). The $T_{c,onset}$, $T_p$, and $T_{c,endset}$ values characterized by fluorescence are compiled in Table 2. According to both FIG. 8C and Table 2, the nonisothermal melt crystallization process of CN-PLLA during 2° C. min$^{-1}$ cooling as characterized on the $I_p'(T)$ plot starts at $T_{c,onset}$=137.0 (±1.5) ° C., then exhibits a maximum at $T_p$= 122.0 (±1.5) ° C., and finally ends at $T_{c,endset}$=108.0 (±1.5) ° C.

TABLE 2

$T_{c,\,onset}$, $T_p$, and $T_{c,\,endset}$ values characterized by both fluorescence and DSC measurements as well as crystallinity values characterized by XRD for CN-PLLA after nonisothermal melt crystallization at various cooling rates ranging from 1 to 64° C. min$^{-1}$.

| Cooling Rate | Fluorescence Measurement (±1.5° C.) | | | DSC Measurement (±1° C.) | | | XRD Measurement Crystallinity |
|---|---|---|---|---|---|---|---|
| (° C. min$^{-1}$) | $T_{c,\,onset}$ | $T_p$ | $T_{c,\,endset}$ | $T_{c,\,onset}$ | $T_p$ | $T_{c,\,endset}$ | (%) |
| 1 | 140.0 | 126.5 | 114.5 | 139.0 | 131.5 | 121.5 | 52.2 |
| 2 | 137.0 | 122.0 | 108.0 | 136.5 | 126.0 | 113.0 | 50.0 |

TABLE 2-continued $T_{c, onset}$, $T_p$, and $T_{c, endset}$ values characterized by both fluorescence
and DSC measurements as well as crystallinity values characterized
by XRD for CN-PLLA after nonisothermal melt crystallization at various
cooling rates ranging from 1 to 64° C. min$^{-1}$.

| Cooling Rate | Fluorescence Measurement (±1.5° C.) | | | DSC Measurement (±1° C.) | | | XRD Measurement Crystallinity |
|---|---|---|---|---|---|---|---|
| (° C. min$^{-1}$) | $T_{c, onset}$ | $T_p$ | $T_{c, endset}$ | $T_{c, onset}$ | $T_p$ | $T_{c, endset}$ | (%) |
| 4 | 133.0 | 115.5 | 96.0 | 133.5 | 118.5 | 99.0 | 45.0 |
| 8 | 129.5 | 105.0 | 90.0 | 129.5 | 102.0 | 77.5 | 39.3 |
| 16 | 123.5 | 102.0 | 78.5 | 124.5 | 97.5 | 71.5 | 11.6 |
| 32 | 107.0 | 97.0 | 77.0 | 109.0 | 95.5 | 71.5 | 0.6 |
| 64 | None | None | None | N/A | N/A | N/A | 0 |

None: The nonisothermal crystallization process was not detectable via fluorescence.
N/A: The nonisothermal crystallization during 64° C. min$^{-1}$ cooling was not measured by DSC.

Figures 9A, 9B:
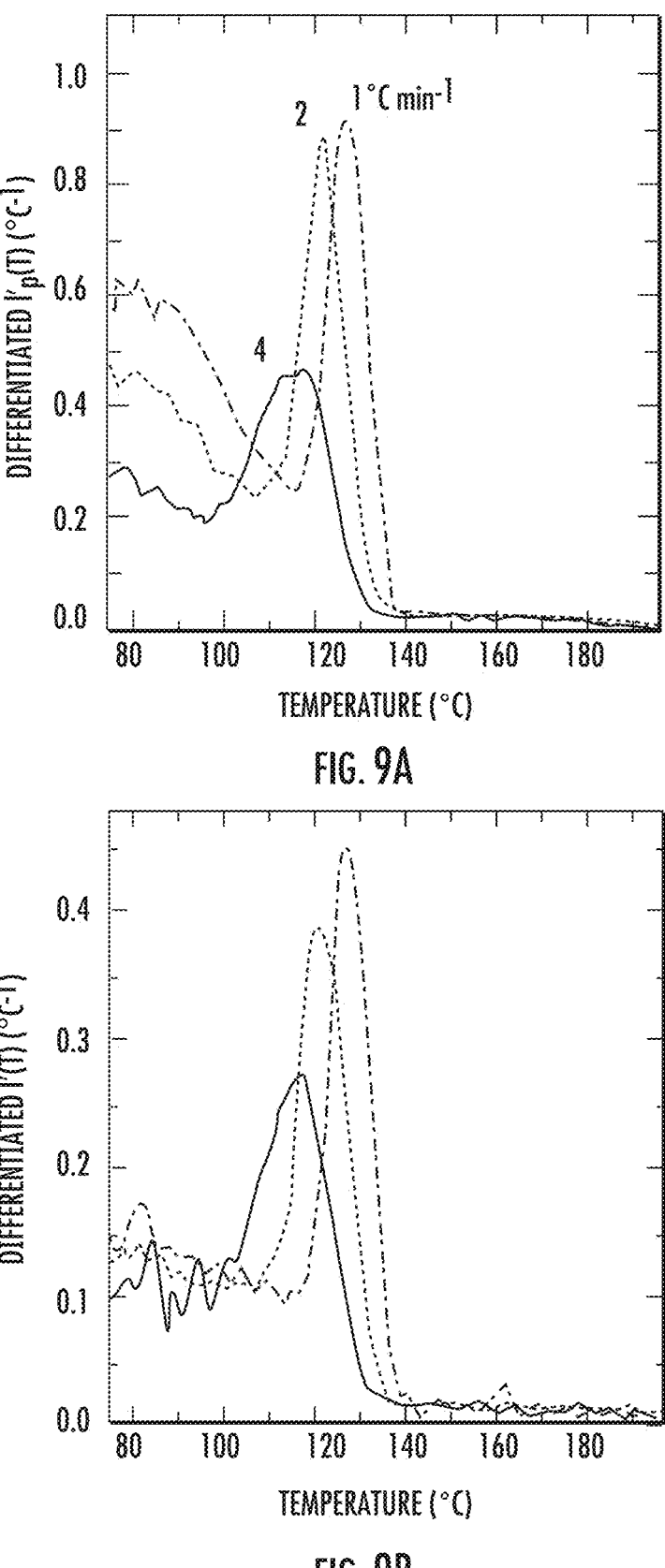
FIG. 9A presents $I_p'(T)$ and FIG. 9B presents I'(T) data obtained from the single-point and spectra methods, respectively, during nonisothermal melt crystallization of CN-PLLA at 1, 2, and 4° C. $min^{-1}$ cooling.

FIG. 8D displays the I'(T) data obtained by the traditional spectra method, i.e., derivative of the integrated intensity I(T) that was characterized by integrating the area under each fluorescence emission spectrum in FIG. 8A. A comparison between FIGS. 8C and 8D indicates that the $I_p$'(T) data obtained by our new single-point method were nearly identical to the I'(T) data derived from the traditional spectra method, i.e., both methods reported within error the same $T_{c,onset}$, $T_p$, and $T_{c,endset}$ values of the nonisothermal melt crystallization process of CN-PLLA during 2° C. min$^{-1}$ cooling. A close match between the nonisothermal crystallization processes characterized by these two methods was also observed at other cooling rates (e.g., 1 and 4° C. min$^{-1}$ cooling; FIGS. 9A-9B). These results confirm the validity of this single-point method for characterizing the representative T-dependent fluorescence behavior of the crystallizing polymeric matrix, while its advantage over the traditional spectra method lies in the capability of monitoring nonisothermal crystallization behavior at faster cooling rates.

Figure 10A:
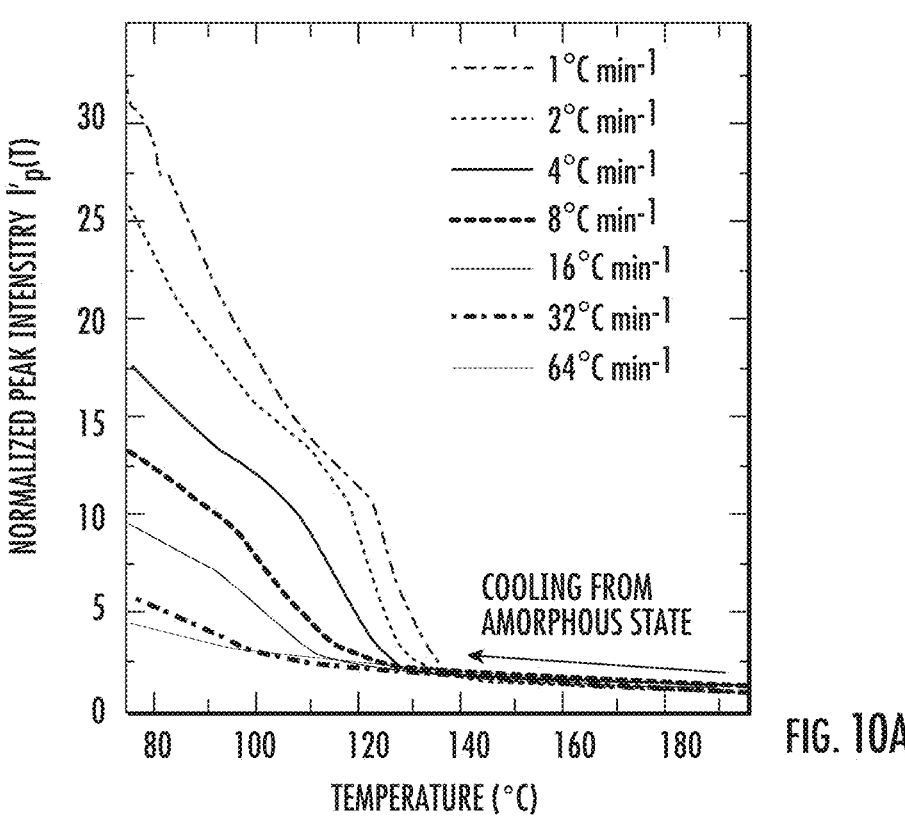
FIG. 10A presents $I_p(T)$ data after normalizing to the value at 195° C.
Figure 11:
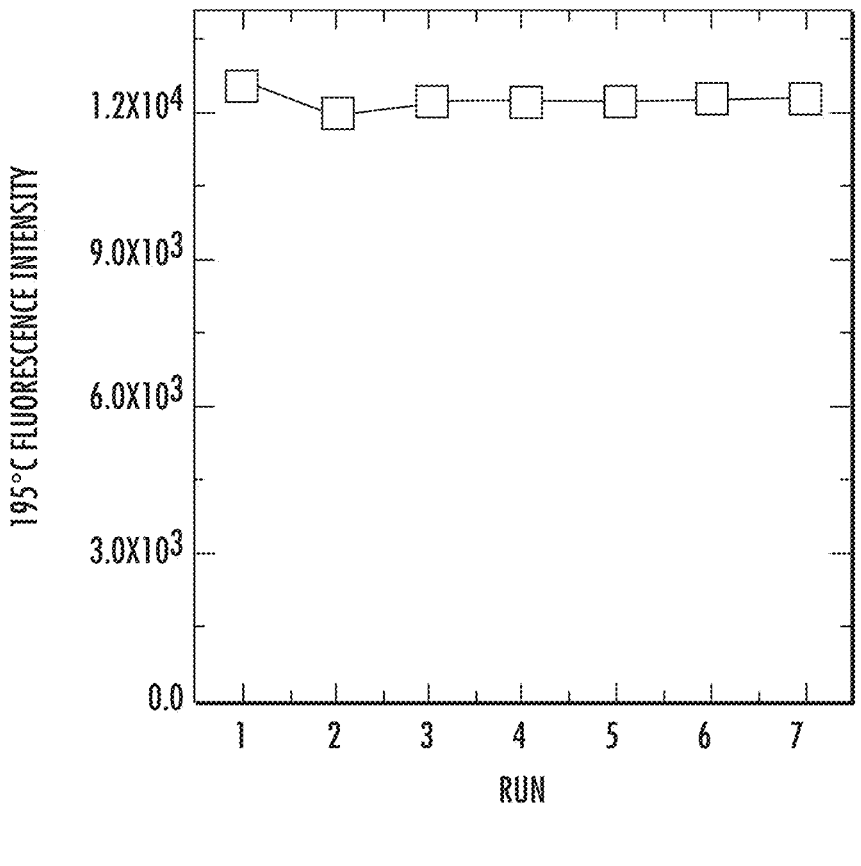
FIG. 11 presents fluorescence intensity at 195° C. measured with the single-point method at the beginning of 7 consecutive nonisothermal crystallization tests.

After establishing the single-point fluorescence method, the nonisothermal melt crystallization behavior of CN-PLLA was examined at different cooling rates, i.e., 1, 2, 4, 8, 16, 32, and 64° C. min$^{-1}$, and the resulting $I_p$(T) data (after normalizing to $I_p$ at 195° C.) are compiled in FIG. 10A. It is worth noting that all the nonisothermal fluorescence experiments at different cooling rates were performed on the same CN-PLLA film to avoid possible sample variations. More importantly, the $I_p$ value at 195° C. showed negligible hysteresis effects, i.e., the peak fluorescence intensity $I_p$ remained within error the same at 195° C. after seven cooling-heating-cooling cycles (FIG. 11). This conveys two important pieces of information: (1) The CN-PLLA used in this study is relatively stable to photobleaching or other thermal degradation/oxidation reactions within the selected temperature range and experimental timescale, in agreement with the TGA thermostability results discussed above; (2) All fluorescence measurements of CN-PLLA started at a nearly identical, completely amorphous state (i.e., 0% crystallinity), where radiative fluorescence emission was strongly suppressed due to highly mobile intramolecular motions of CN$_4$OH luminogens.

As shown in FIG. 10A, all the $I_p$(T) data collected during nonisothermal melt crystallization processes at various cooling rates ranging from 1 to 64° C. min$^{-1}$ exhibit a nearly identical linear increase from 1 at 195° C. to ~2.0 at ~135° C. All the $I_p$(T) functions, except that obtained for 64° C. min$^{-1}$ cooling, show stepwise increases due to nonisothermal melt crystallization as discussed above. As the cooling rate increases from 1 to 32° C. min$^{-1}$, the onset and slope of this stepwise increase in the $I_p$(T) function (i.e., nonisothermal melt crystallization) shifts to a lower T value and becomes steeper, respectively. After going through a stepwise increase, the $I_p$(T) data exhibit an almost linear increase again. In stark contrast, when the CN-PLLA sample is cooled at 64° C. min$^{-1}$, the $I_p$(T) data show a continuous, almost linear increase with decreasing T, without clear evidence of a stepwise change in fluorescence intensity. This suggests that no detectable nonisothermal crystallization is characterized by fluorescence at this particular cooling rate.

Figure 12:
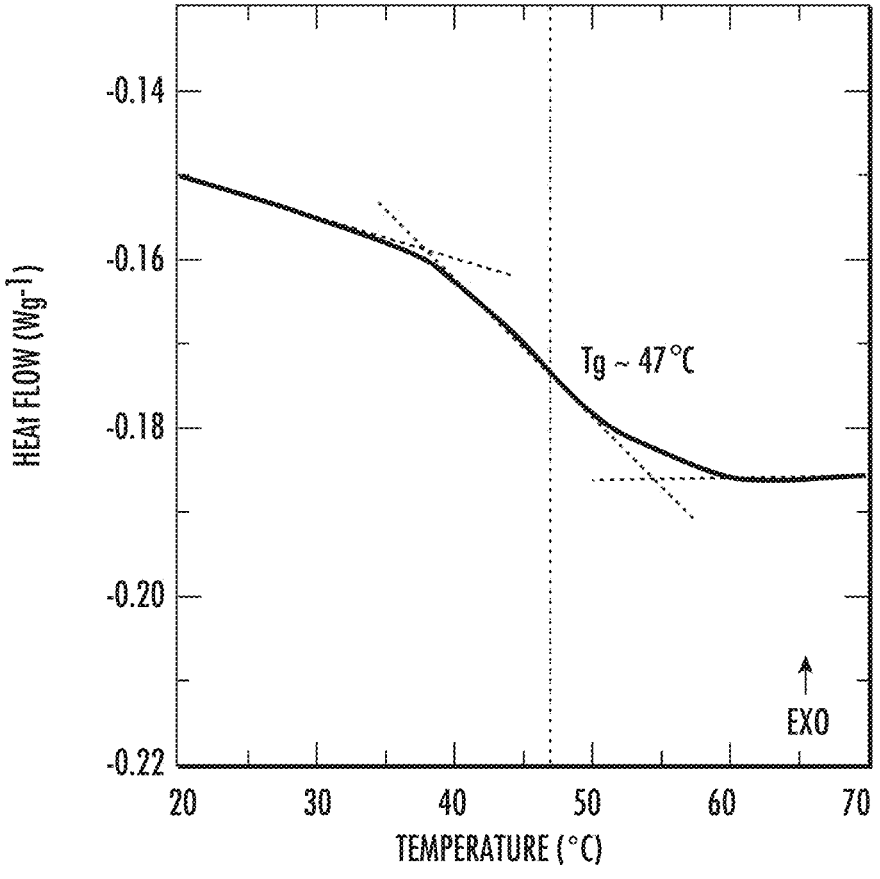
FIG. 12 shows heat flow vs. temperature during a 10° C. $min^{-1}$ second heating scan, based on which the glass transition temperature of CN-PLLA can be estimated to be around 47° C.

Importantly, the final $I_p$ value at 75° C. in FIG. 10A increases with deceasing cooling rate, e.g., the $I_p$ value at 75° C. is ~4.5 and ~31.3 after cooling at 64 and 1° C. respectively. It is noteworthy that 75° C. is well above the $T_g$ of the synthesized CN-PLLA (~47° C.; FIG. 12). When comparing all final $I_p$ values at 75° C., the stronger fluorescence intensity of the bulk CN-PLLA film can be correlated with a higher crystallinity achieved after cooling at a slower rate. It has been well established in the literature that the crystallinity attainable during nonisothermal crystallization typically decrease with increasing cooling rate.[4] As the crystallinity increases in the CN-PLLA matrix, the rigidity of the local environment that surrounds the CN$_4$OH dye labels is enhanced and thus the intramolecular motions of these AIE luminogens are restricted, which in turn promotes the radiative fluorescence emission.

Figure 10B:
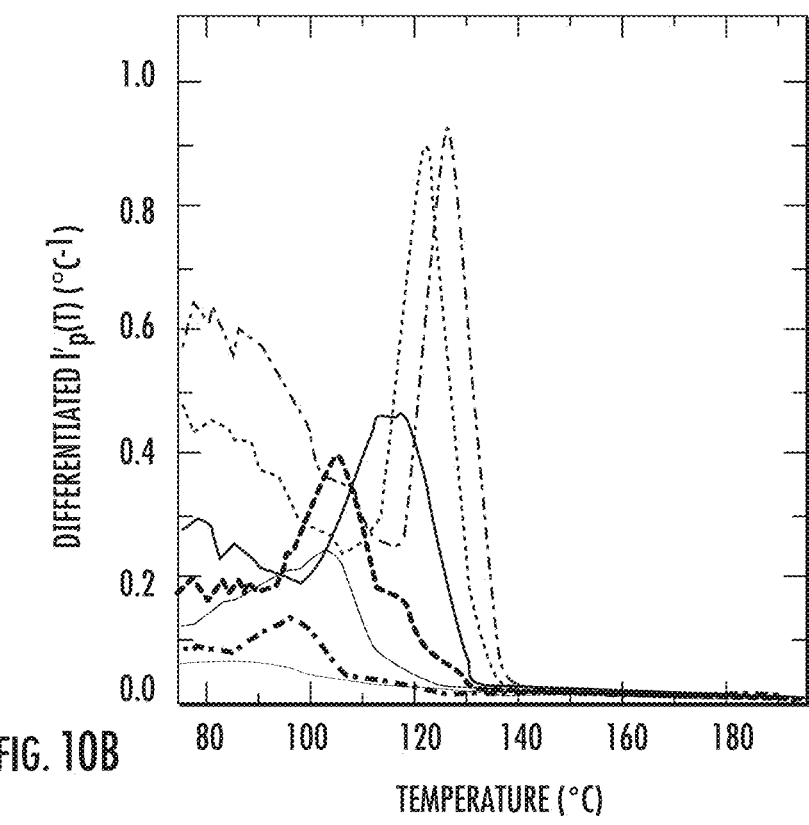
FIG. 10B presents corresponding $I_p'(T)$ data in absolute values collected during nonisothermal crystallization of CN-PLLA at various cooling rates ranging from 1 to 64° C. $min^{-1}$.

Similarly, all the $I_p$(T) data in FIG. 10A were differentiated to better reveal the underlying nonisothermal crystallization processes at various cooling rates, and the resulting $I_p$'(T) functions were compiled in FIG. 10B. According to FIG. 10B, the nonisothermal crystallization processes for the bulk CN-PLLA film during 1-32° C. min$^{-1}$ cooling are apparent by deviations from the baseline and shown as peaks on the $I_p$'(T) functions. As the cooling rate increases from 1 to 32° C. min$^{-1}$, the crystallization peak as characterized by fluorescence in FIG. 10B shifts towards a lower temperature.

Comparison Between Fluorescence and DSC Nonisothermal Crystallization Results

Figure 13:
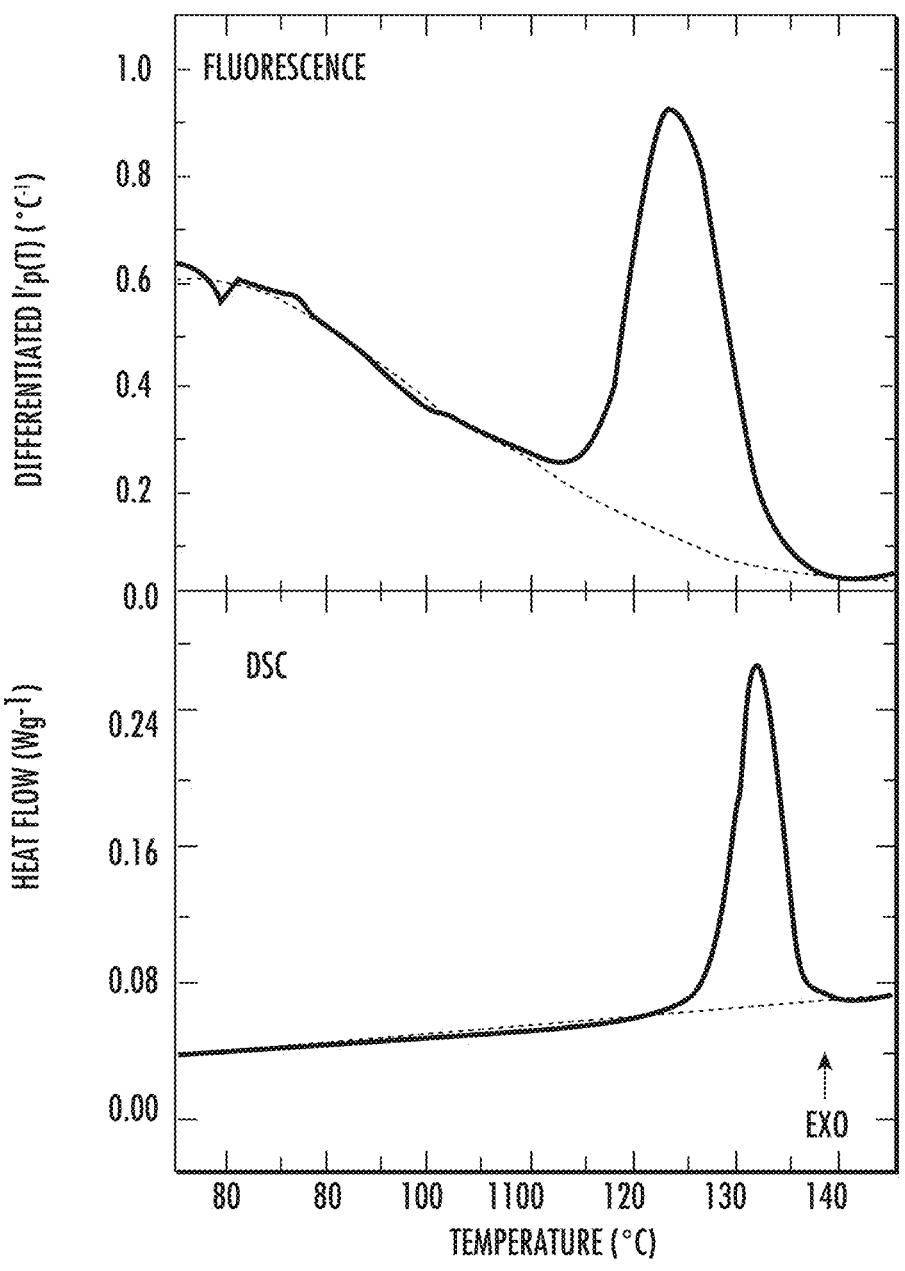
FIG. 13 shows Baseline estimation (lower) for (A) $I_p'(T)$ curve (upper line) and (B) corresponding DSC thermogram (upper line). The CN-PLLA sample cooled at 1° C. $min^{-1}$ is shown here as a representative example of the baseline estimation process.
Figure 14:
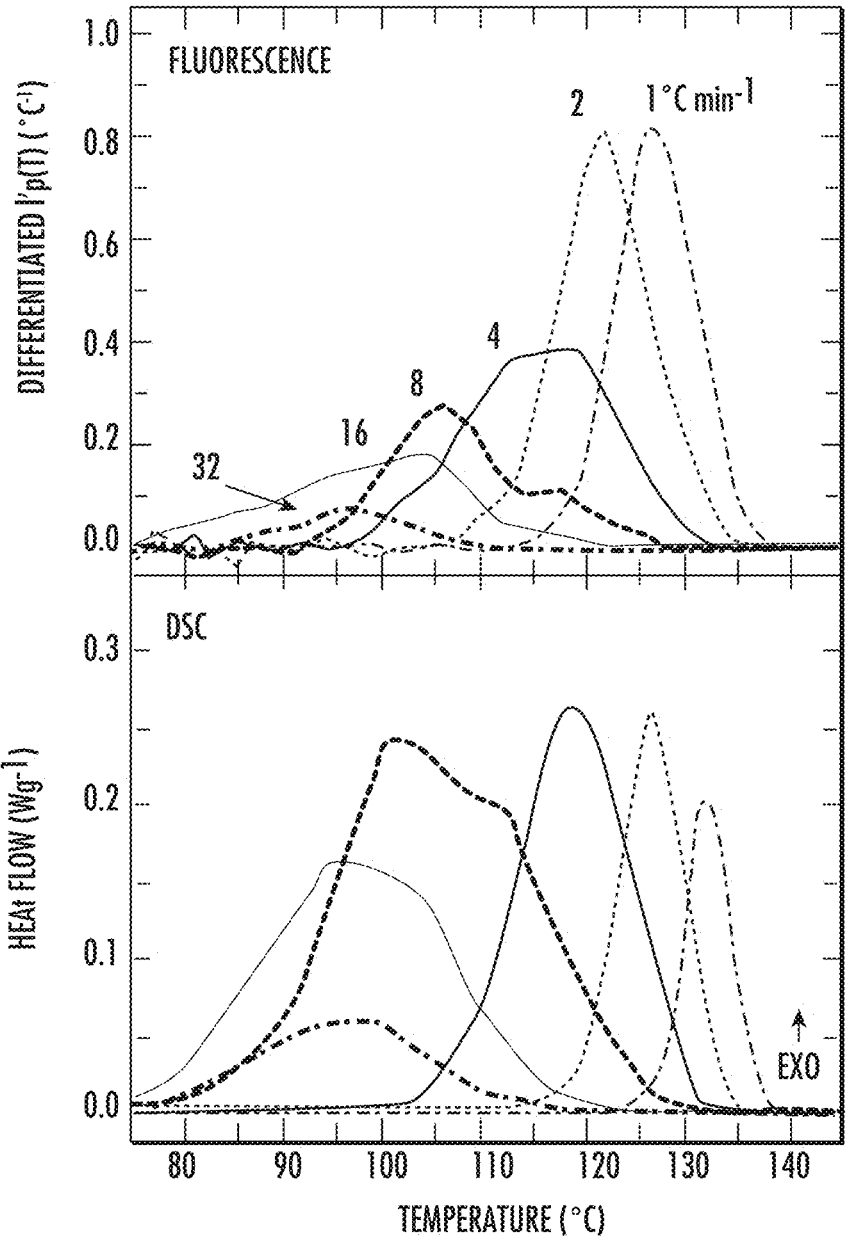
FIG. 14 presents (A) $I_p'(T)$ curves in FIG. 10B after baseline subtraction and (B) Corresponding DSC thermograms collected during nonisothermal crystallization of CN-PLLA at various cooling rates ranging from 1 to 64° C. $min^{-1}$.
Figures 15A, 15B:
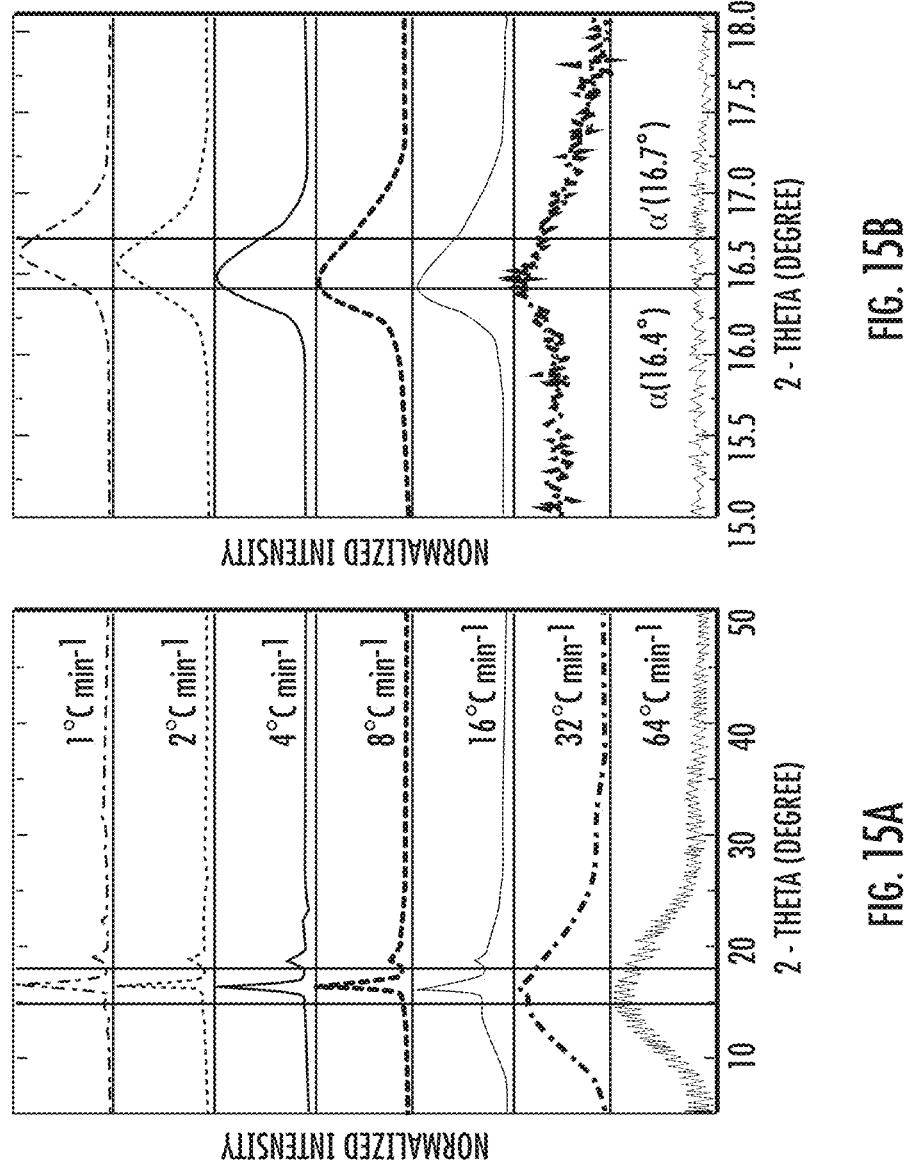
FIG. 15A presents XRD spectra of CN-PLLA obtained at room temperature after nonisothermal crystallization of CN-PLLA at various cooling rates ranging from 1 to 64° C. $min^{-1}$
FIG. 15B presents enlarged (200/110) diffraction peaks in FIG. 15A in the 15-18° 2θ range to highlight the shift from primarily α to primarily α' crystal forms with increasing cooling rate.

To better highlight the nonisothermal crystallization process, the $I_p$'(T) functions in FIG. 10B were flattened by subtracting the baselines (see FIG. 13 for an example of baseline subtraction), and the resulting data are compiled in FIG. 14. Similarly, the $T_{c,onset}$, $T_p$, and $T_{c,endset}$ values associated with these nonisothermal melt crystallization processes at different cooling rates can be determined from the flattened $I_p$'(T) functions in FIG. 14, and the resulting values are compiled in Table 2. As shown in both FIG. 14 and Table 2, the $T_{c,onset}$, $T_p$, and $T_{c,endset}$ values characterized by fluorescence generally decrease with increasing cooling rate. In addition, the crystallization peak initially broadens as the cooling rate increases from 1 to 16° C. min$^{-1}$ and then narrows as the cooling rate further increases to 32° C. min$^{-1}$. When the cooling rate is further increased to 64° C. min$^{-1}$, the $I_p'(T)$ function shows no evidence of a crystallization peak. This is in agreement with the XRD spectrum of CN-PLLA collected after quenching from 195 to 75° C. at 64° C. FIGS. 15A-15B, which confirms the amorphous nature of the resulting sample (i.e., only a single broad peak is observed on the XRD spectrum, without any distinct, sharp peaks associated with crystalline microstructures).

To further demonstrate the validity of our fluorescence technique for monitoring nonisothermal melt crystallization, DSC measurements were also performed on the same CN-PLLA sample. FIG. 14 compiles all the DSC thermograms collected at various cooling rates ranging from 1 to 32° C. min$^{-1}$. It is noteworthy that the maximum cooling rate that the DSC instrument in this study (TA Discovery DSC2500) can achieve is ~40° C. min$^{-1}$ at this temperature range. Therefore, it is impossible to monitor the nonisothermal crystallization process via DSC at cooling rates greater than 40° C. min$^{-1}$ (e.g., 64° C. min$^{-1}$). This demonstrates an advantage of our fluorescence technique over conventional DSC, i.e., our fluorescence technique is capable of monitoring nonisothermal melt crystallization behavior at faster cooling rates that are more relevant to the industrial polymer processing (e.g., injection molding, film blowing, and fiber spinning) conditions.

According to FIG. 14, the nonisothermal melt crystallization process of CN-PLLA at each cooling rate appears as an exothermic peak on the DSC thermogram. Similarly, $T_{c,onset}$, $T_p$, and $T_{c,endset}$ values can also be determined by DSC, and the corresponding values are compiled in Table 2. A comparison of the nonisothermal crystallization processes characterized by fluorescence with those by DSC suggests a relatively good agreement between these two characterization techniques. As shown in FIGS. 15A and 15B, the overall shape of each nonisothermal crystallization peak characterized by fluorescence is almost identical to that by DSC. Interestingly, the $T_{c,onset}$ values, i.e., the onsets of the nonisothermal crystallization processes, characterized by both DSC and fluorescence at different cooling rates are within error the same (FIGS. 15A and 15B and Table 2), suggesting that the effects of heat transfer should be similar between these two techniques. The $T_p$, and $T_{c,endset}$ values determined by DSC and fluorescence, however, show slight discrepancies (within ~10° C. difference), and we attribute this to the intrinsically different sensing mechanisms of these two techniques. While DSC measures the overall heat flow (related to enthalpy) generated during nonisothermal melt crystallization, the fluorescence signal of a CN$_4$OH dye is sensitive to its local environment. Such a difference in their sensing mechanisms could help rationalize the relatively small discrepancies in the $T_p$ and $T_{c,endset}$ values determined by DSC and fluorescence techniques, although more studies are warranted to uncover the fundamental origin of this phenomenon.

Sensitivity of Fluorescence to Crystalline Microstructures

As shown in both FIGS. 10B and 14, the nonisothermal crystallization process of CN-PLLA during 8° C. min$^{-1}$ cooling characterized by fluorescence appears as a bimodal peak. This can be attributed to the fact that PLLA is capable of crystallizing into both α and α' form crystals during nonisothermal melt crystallization, depending on the cooling rate. As shown in FIGS. 15A-15B, the most intensive diffraction peak on each XRD spectrum (obtained at room temperature, i.e., below $T_g$, after nonisothermal crystallization during 1-32° C. min$^{-1}$ cooling), which is intrinsically related to the PLLA crystal microstructure, shifts towards a lower 2θ value as the cooling rate increases. It has been well established in the literature that the α form PLLA crystal is a more conformationally ordered crystalline structure in which helical PLLA chain segments are regularly aligned in an orthorhombic unit cell (corresponding to a diffraction peak at a higher 2θ value of ~16.7°; In contrast, the α' form PLLA crystal is a more conformationally disordered crystalline structure with more conformational defects (corresponding to a diffraction peak at a lower 2θ value of ~16.4° (FIG. 15B). The XRD results in FIGS. 15A-15B clearly indicate that the formation of more stable α form PLLA crystals dominates the nonisothermal crystallization of CN-PLLA at relatively slow cooling rates (e.g., 1 and 2° C. min$^{-1}$ cooling), whereas the formation of less stable α' form PLLA crystals is more prominent during nonisothermal crystallization at relatively fast cooling rates (e.g., 32° C. min$^{-1}$ cooling). A simultaneous formation of both α and α' form PLLA crystals during nonisothermal crystallization at intermediate cooling rates (e.g., 8° C. min$^{-1}$ cooling) could lead to the arise of a bimodal peak on the fluorescence $I_p'(T)$ function in FIGS. 11 and 15A. These results indicate that our fluorescence technique is intrinsically sensitive to the crystalline microstructures formed in a crystallizing polymer matrix.

Figure 16:
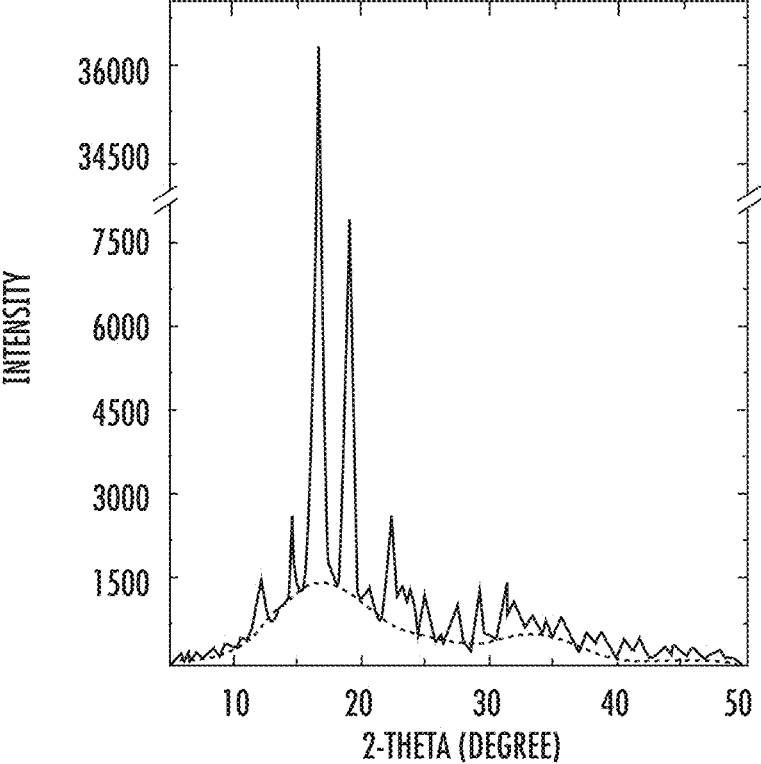
FIG. 16 shows deconvolution of the amorphous fraction (lower line) from total XRD spectra (upper line) for calculating the crystallinity of a CN-PLLA sample. The CN-PLLA sample cooled at 1° C. $min^{-1}$ is shown here as a representative example of the deconvolution process.

To establish the fundamental relationships between crystallinity, enthalpy of crystallization, and fluorescence behavior, the degrees of crystallinity of CN-PLLA after nonisothermal melt crystallization at different cooling rates were characterized using XRD. It should be noted that the XRD measurements were performed on the CN-PLLA sample at room temperature (i.e., ~25° C. below $T_g$) shortly after nonisothermal melt crystallization, where no additional crystallization could occur. Therefore, the % crystallinity measured by XRD should be the maximal crystallinity attainable during nonisothermal crystallization. Specifically, the % crystallinity of each sample was determined by calculating the ratio between the area of the deconvoluted crystalline peaks and the total area of the crystalline and amorphous peaks on each XRD spectrum in FIGS. 15A-15B (see an example determination in FIG. 16), and the resulting crystallinity values are compiled in Table 2. As shown in both FIGS. 15A-15B and Table 2, the % crystallinity of CN-PLLA after nonisothermal melt crystallization during 1-64° C. min$^{-1}$ cooling is in the range between 0 and ~52% and decreases with increasing cooling rate, in agreement with previous literature.

Figure 17:
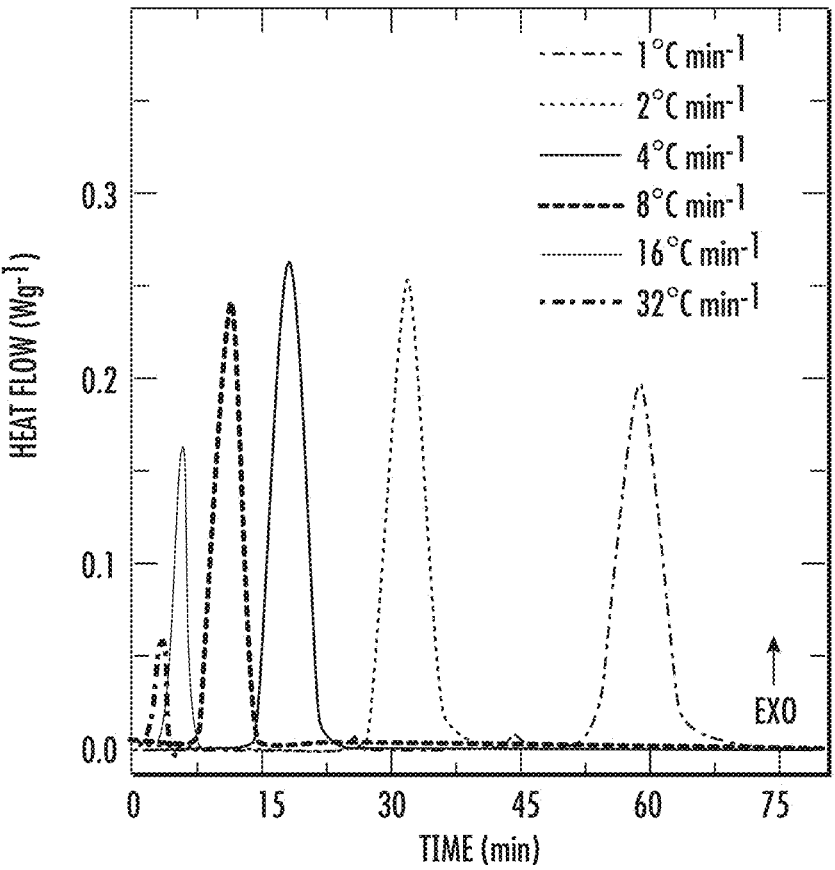
FIG. 17 shows DSC heat flow vs. time thermograms of CN-PLLA collected at different cooling rates.
Figures 18A, 18B:
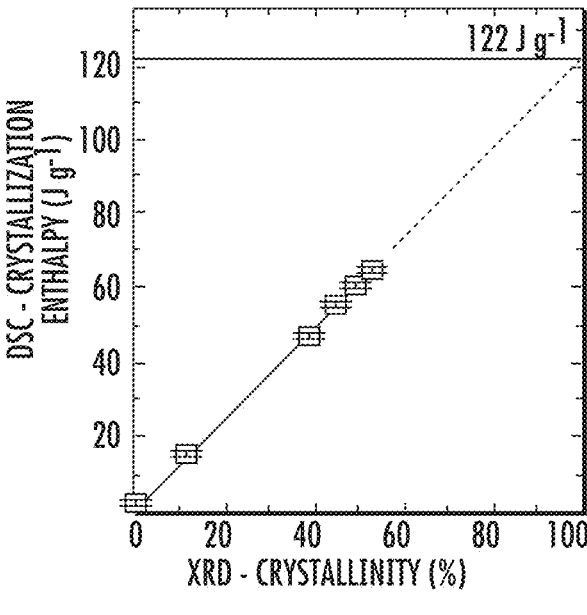
FIGS. 18A-18D present Crystallinity (determined by XRD) dependences of FIG. 18A Absolute enthalpy of crystallization of CN-PLLA determined by DSC.

To determine the enthalpy of crystallization, the T-dependent heat flow DSC thermograms in FIG. 14 were first converted to the time-dependent DSC thermograms in FIG. 17, based on their respective cooling rates. Then enthalpy of melt crystallization at each cooling rate was determined by integrating the area under the crystallization peak as characterized by the DSC heat flow(time) thermograms in FIG. 17. FIG. 18A plots the absolute value of the crystallization enthalpy measured by DSC against the % crystallinity determined by XRD. It is noteworthy that polymer crystallization is an exothermic process; Therefore, the enthalpy of crystallization values determined by DSC are actually negative. Absolute values are plotted in FIG. 18A for better visualization. In addition, it is worth noting that DSC measurement was not performed at 64° C. min$^{-1}$ cooling due to instrument limitation; Thus, the CN-PLLA sample after 64° C. min$^{-1}$ cooling is not included in FIGS. 18A-18D.

As shown in FIG. 18A, the absolute value of crystallization enthalpy determined by DSC shows a nearly linear relationship with the % crystallinity measured by XRD, which is in agreement with previous literature. Such a strong correlation between XRD and DSC measurements arises because both the area below the XRD diffraction peaks and the enthalpy of crystallization measured by DSC are equally sensitive to the total amount of crystals formed during nonisothermal melt crystallization. Importantly, the absolute enthalpy of crystallization of 100% crystalline CN-PLLA extrapolated using the linear fit in FIG. 18A is ~122 g$^{-1}$, which is between the reported absolute enthalpies of crystallization of PLLA crystals in 100% α' (−80 J g$^{-1}$) and α(−130 J g$^{-1}$) crystalline forms. This is reasonable since nonisothermal melt crystallization of CN-PLLA during 1 to 32° C. min$^{-1}$ cooling can result in a mixture of α and α' form crystals, thus giving rise to an average absolute crystallization enthalpy at 100% crystallinity between those of pure α and α' form crystals.

In stark contrast, FIG. 18B shows that there is a nonlinear relationship between the normalized fluorescence peak intensity $I_p$ at 75° C. (replotted from FIG. 10A) and the % crystallinity determined by XRD. At relatively low % XRD crystallinity values, the $I_p$ value at 75° C. exhibits a gradual, almost linear increase from ~5 at ~1% crystallinity to ~13 at ~40% crystallinity (i.e., $I_p$ increases by ~0.2 as crystallinity increases by 1%). As the % XRD crystallinity further increases above 40%, there is a substantial positive deviation in the $I_p$ value from this linear relationship, and it increases much more dramatically from ~17 at ~45% crystallinity to ~31 at ~52% crystallinity (i.e., $I_p$ increases by ~2 as crystallinity increases by 1%, nearly 10 times that of the sensitivity at low % crystallinity). We attribute this substantial positive deviation to the transition of PLLA crystals from primarily α' to α crystalline forms, depending on the cooling rate employed for nonisothermal melt crystallization.

At relatively fast cooling rates such as 32, 16, and 8° C. min$^{-1}$ (corresponding to lower XRD % crystallinity values), the PLLA crystals obtained after nonisothermal melt crystallization are primarily in the α' crystalline form (as shown by XRD in FIG. 15B), which is a more conformationally disordered and less stable crystalline structure with more conformational defects. Such a crystalline microstructure would have less restriction on the intramolecular motions of fluorophores (e.g., rotations; nonradiative energy decay) and thus enhance the radiative fluorescence emission to a less extent. Consequently, the fluorescence peak intensity $I_p$ at 75° C. would be less sensitive to the change in crystallinity and therefore exhibits a gradual increase with increasing XRD % crystallinity in FIG. 18B. At relatively slow cooling rates such as 4, 2, and 1° C. min$^{-1}$ (corresponding to higher XRD % crystallinity), however, the resulting PLLA crystals after nonisothermal melt crystallization are primarily in the α crystalline form (as shown by XRD in FIG. 15B), which is a more conformationally ordered and stable crystalline structure. This crystalline microstructure is expected to have more restriction on the intramolecular motions of fluorophores and consequently enhance the radiative fluorescence emission to a much greater extent. Consequently, the fluorescence peak intensity $I_p$ at 75° C. would be much more sensitive to the change in crystallinity and therefore exhibits a dramatic increase with increasing XRD % crystallinity in FIG. 18B.

Figure 18C:
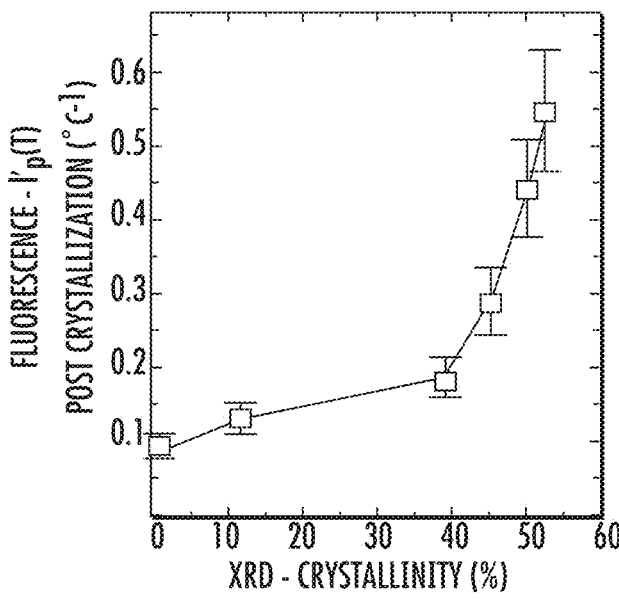
Figure 18D:
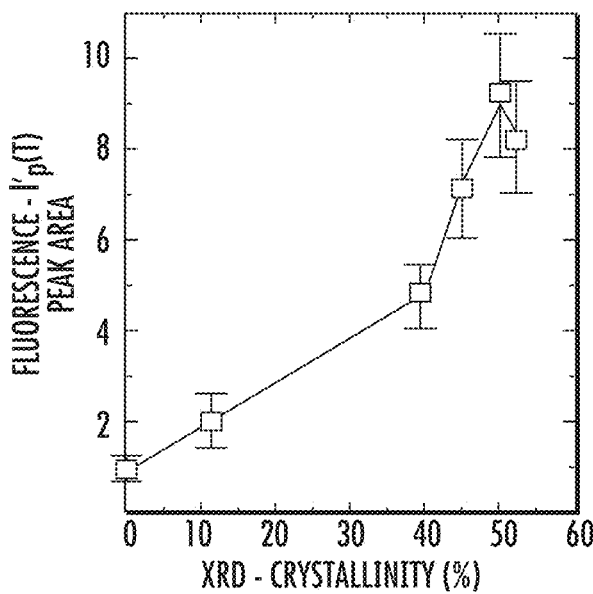

In addition, FIG. 18C plots the plateau $I_p$' values in the T range between 75 and 80° C. in FIG. 10B against the XRD % crystallinity, where the $I_p$' value quantify the sensitivity of fluorescence intensity to the T change when CN-PLLA is in the semicrystalline state above its $T_g$. Furthermore, FIG. 18D plots the integrated area under the melt crystallization peak on the $I_p$'(T) curve in FIG. 14 against the XRD % crystallinity, where the integrated peak area is equivalent to the stepwise change in $I_p$ due to crystallization in FIG. 10A. Similarly, both the plateau $I_p$' values in FIG. 18C and the integrated $I_p$' peak area in FIG. 18D exhibit a nonlinear dependence on the XRD % crystallinity similar to that is observed in FIG. 18B, which further supports our hypothesis on the abovementioned correlation between the fluorescence behavior and the crystalline microstructures. Therefore, these results demonstrate that our fluorescence technique is sensitive to not only the % crystallinity but also the crystalline microstructures (e.g., α and α' form crystals) in the semicrystalline polymer matrix.

Figure 19:
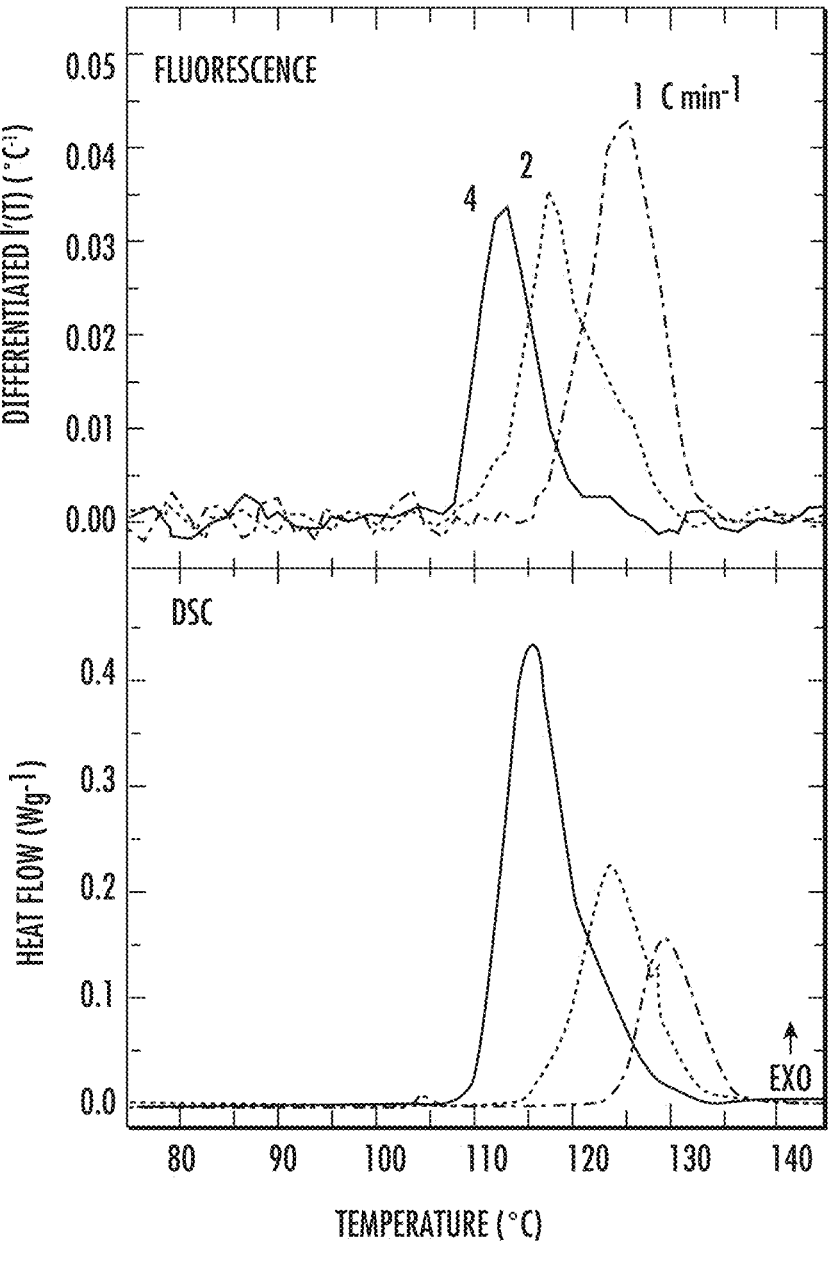
FIG. 19 presents (A) I'(T) curves (after baseline subtraction) for $CN_4OH$ doped PLLA during nonisothermal melt crystallization process at 1, 2, and 4° C. $min^{-1}$ cooling and (B) Corresponding DSC thermograms collected at the same cooling rates.

Generalizability of this Fluorescence Technique for Nonisothermal Crystallization Studies It is equally important to highlight that this fluorescence technique can also be applied to monitor the nonisothermal melt crystallization process through simple physical incorporation of fluorescent dye dopants at a trace level via crystallizing polymer matrix (FIG. 19). Such a dye doping technique could allow convenient determination of the nonisothermal crystallization of a given semicrystalline polymer. Moreover, building on our previous success in the use of this fluorescence technique for characterizing $T_m$, it is reasonable to anticipate that this fluorescence technique can be applied with various types of fluorescent probes (e.g., AIE luminogens or pyrene) and generalized to many semicrystalline thermoplastics (e.g., poly(caprolactone), poly(ethylene oxide), polyethylene, polypropylene, and polyethylene terephthalate), while maintaining excellent sensitivity to nonisothermal crystallizations.

CONCLUSIONS

In conclusion, we have developed a new and simple fluorescence technique for sensing the nonisothermal melt crystallization of semicrystalline thermoplastics, by monitoring the T-dependent fluorescence intensity of the fluorescent probes molecularly incorporated into the crystallizing polymer matrices in situ. When crystals start to form in the polymer matrix during cooling from the melt state, the intramolecular motions of fluorophores are restricted by the formed crystals and thus their T-dependent fluorescence intensity data exhibit a stepwise increase due to melt crystallization. The first derivative data of the T-dependent fluorescence intensity unveil more details of the underlying nonisothermal melt crystallization process, such as the onset and endset of the nonisothermal melt crystallization as well as the peak crystallization temperature. The nonisothermal melt crystallization processes characterized by fluorescence resembles those measured by conventional DSC, confirming the validity of our fluorescence technique for sensing crystallization behavior. Compared to conventional DSC, our fluorescence technique offers several unique advantages: (1) This fluorescence method can enable nonisothermal melt crystallization studies at much faster cooling rates (up to ~100° C. min$^{-1}$ cooling in this study) that are more relevant to industrial polymer processing conditions; (2) The fluorescence intensity of the incorporated fluorophores is intrinsically sensitive to not only the % crystallinity but also the crystalline microstructures (e.g., a and a' form crystals) in the semicrystalline polymer matrix. (3) The use of fluorescent labels could allow for novel studies on the local crystallization behavior within heterogeneous polymeric systems (e.g., blends, filler-reinforced thermoplastic composites, and multilayer polymer films) that cannot be accomplished using conventional techniques including DSC and XRD. Overall, our fluorescence technique represents a simple, in situ, and contact-free nonisothermal melt crystallization characterization approach. Such a novel fluorescence technique can contribute significantly to polymer crystallization research and potentially reveal the guiding principles for the design and processing of semicrystalline thermoplastics.

It will be understood that implementations are not limited to the specific components disclosed herein, as virtually any components consistent with the intended operation of a method and/or system implementation for characterizing a melting transition in a semicrystalline polymer may be utilized. Accordingly, for example, although particular methods for characterizing a melting transition in a semicrystalline polymer may be disclosed, such components or steps may comprise any shape, size, style, type, model, version, class, grade, measurement, concentration, material, weight, quantity, and/or the like consistent with the intended operation of a method and/or system implementation for characterizing a melting transition in a semicrystalline polymer may be used. In places where the description above refers to particular implementations of a method for characterizing a melting transition in a semicrystalline polymer, it should be readily apparent that a number of modifications may be made without departing from the spirit thereof and that these implementations may be applied to other melting transition characterization methods.

What is claimed is:

1. A method for characterizing a melting transition in a semicrystalline polymer, comprising:
   incorporating a fluorophore into the semicrystalline polymer;
   changing a temperature of the semicrystalline polymer to vary across a range of temperatures comprising a plurality of temperatures;
   capturing an emission spectrum of the incorporated fluorophore at each temperature of the plurality of temperatures;
   integrating each emission spectrum to determine a temperature-dependent integrated fluorescence intensity for the semicrystalline polymer;
   numerically differentiating the temperature-dependent integrated fluorescence intensity; and
   characterizing the melting transition of the semicrystalline polymer by identifying a stepwise change in value of the differentiated intensity.

2. The method of claim 1, wherein the melting transition is melt crystallization.

3. The method of claim 2, wherein the melt crystallization is observed in a temperature range of 195° C. to 60° C. or any subset range within the 195° C. and 60° C. range.

4. The method of claim 1, wherein the semicrystalline polymer is a thermoplastic.

5. The method of claim 1, wherein the semicrystalline polymer comprises at least one of polyethylene, polypropylene, poly(L-lactic acid) (PLLA), poly(caprolactone) (PCL), and poly(ethylene oxide) (PEO).

6. The method of claim 1, wherein incorporating the fluorophore into the semicrystalline polymer comprises physically doping the semicrystalline polymer with the fluorophore.

7. The method of claim 1, wherein incorporating the fluorophore into the semicrystalline polymer comprises covalently labeling the semicrystalline polymer with the fluorophore.

8. The method of claim 1, wherein the fluorophore comprises 1,2-bis(2,4-dihydrobenzylidene) hydrazine.

9. The method of claim 1, wherein the capturing an emission spectrum of the incorporated fluorophore comprises placing the semicrystalline polymer with incorporated fluorophore on a quartz slide.

10. The method of claim 9, wherein the semicrystalline polymer with incorporated fluorophore is cast on the quartz slide from a solution comprising the semicrystalline polymer with incorporated fluorophore.

11. A method of characterizing a melting transition of a semicrystalline polymer having an incorporated fluorophore, the method comprising:
   changing a temperature of the semicrystalline polymer to vary across a range of temperatures comprising a plurality of temperatures;
   capturing an emission spectrum of the incorporated fluorophore at each temperature of the plurality of temperatures;
   integrating each emission spectrum to determine a temperature-dependent integrated fluorescence intensity for the semicrystalline polymer;
   numerically differentiating the temperature-dependent integrated fluorescence intensity; and
   characterizing the melting transition of the semicrystalline polymer by identifying a stepwise change in value of the differentiated intensity.

12. The method of claim 11, wherein the melting transition is melt crystallization.

13. The method of claim 12, wherein the melt crystallization is observed in a temperature range of 195° C. to 60° C. or any subset range within the 195° C. and 60° C. range.

14. The method of claim 11, wherein the semicrystalline polymer is a thermoplastic.

15. The method of claim 11, wherein the semicrystalline polymer comprises at least one of polyethylene, polypropylene, poly(L-lactic acid) (PLLA), poly(caprolactone) (PCL), and poly(ethylene oxide) (PEO).

16. The method of claim 11, wherein incorporating the fluorophore into the semicrystalline polymer comprises physically doping the semicrystalline polymer with the fluorophore.

17. The method of claim 11, wherein incorporating the fluorophore into the semicrystalline polymer comprises covalently labeling the semicrystalline polymer with the fluorophore.

18. The method of claim 11, wherein the fluorophore comprises 1,2-bis(2,4-dihydrobenzylidene) hydrazine.

19. The method of claim 11, wherein the capturing an emission spectrum of the incorporated fluorophore comprises placing the semicrystalline polymer with incorporated fluorophore on a quartz slide.

20. The method of claim 19, wherein the semicrystalline polymer with incorporated fluorophore is cast on the quartz slide from a solution comprising the semicrystalline polymer with incorporated fluorophore.

* * * * *